(12) United States Patent
Prasad et al.

(10) Patent No.: US 11,769,496 B1
(45) Date of Patent: Sep. 26, 2023

(54) PREDICTIVE DELETION OF USER INPUT

(71) Applicant: Amazon Technologies, Inc., Seattle, WA (US)

(72) Inventors: Rohit Prasad, Lexington, MA (US); Shiv Naga Prasad Vitaladevuni, Belmont, MA (US); Prem Natarajan, Rolling Hills Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 470 days.

(21) Appl. No.: 16/711,967

(22) Filed: Dec. 12, 2019

(51) Int. Cl.
*G10L 15/22* (2006.01)
*H04L 29/08* (2006.01)
*G10L 15/18* (2013.01)
*G10L 15/06* (2013.01)
*H04L 67/306* (2022.01)
*G10L 15/08* (2006.01)
*G06F 21/62* (2013.01)
*G10L 15/07* (2013.01)

(52) U.S. Cl.
CPC .............. *G10L 15/22* (2013.01); *G10L 15/063* (2013.01); *G10L 15/1815* (2013.01); *H04L 67/306* (2013.01); *G06F 21/6245* (2013.01); *G10L 15/07* (2013.01); *G10L 2015/088* (2013.01); *G10L 2015/223* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 8,185,392 | B1* | 5/2012 | Strope et al. | G10L 15/07 704/252 |
| 8,589,163 | B2* | 11/2013 | Ljolje et al. | G10L 15/183 704/255 |
| 9,131,369 | B2* | 9/2015 | Ganong, III et al. | G10L 15/30 |
| 9,514,741 | B2* | 12/2016 | Jost et al. | G10L 15/06 |
| 9,594,852 | B2* | 3/2017 | Li | G06F 16/9024 |
| 9,990,925 | B2* | 6/2018 | Weinstein et al. | G10L 15/063 |
| 10,388,272 | B1* | 8/2019 | Thomson et al. | G10L 15/22 |
| 11,057,356 | B2* | 7/2021 | Malhotra et al. | G06F 16/288 |
| 2011/0077942 | A1* | 3/2011 | Ljolje et al. | G10L 15/065 704/244 |
| 2011/0137653 | A1* | 6/2011 | Ljolje et al. | G10L 15/183 704/255 |

(Continued)

*Primary Examiner* — Richard Z Zhu
(74) *Attorney, Agent, or Firm* — PIERCE ATWOOD LLP

(57) ABSTRACT

Described are techniques for predicting when data associated with a user input is likely to be selected for deletion. The system may use a trained model to assist with such predictions. The trained model can be configured based on deletions associated with a user profile. An example process can including receiving user input data corresponding to the user profile, and processing the user input data to determine a user command. Based on characteristic data of the user command, the trained model can be used to determine that data corresponding to the user command is likely to be selected for deletion. The trained model can be iteratively updated based on additional user commands, including previously received user commands to delete user input data.

20 Claims, 16 Drawing Sheets

(56) References Cited

U.S. PATENT DOCUMENTS

| | | | |
|---|---|---|---|
| 2014/0129226 A1* | 5/2014 | Lee et al. | G10L 15/04 704/254 |
| 2014/0207442 A1* | 7/2014 | Ganong, III et al. | G10L 15/30 704/201 |
| 2014/0278426 A1* | 9/2014 | Jost et al. | G10L 15/06 704/257 |
| 2016/0048527 A1* | 2/2016 | Li | G06F 16/9024 707/723 |
| 2017/0171671 A1* | 6/2017 | Smith et al. | H04R 25/30 |
| 2018/0075251 A1* | 3/2018 | Van Hoof et al. | G06F 21/6227 |
| 2018/0330722 A1* | 11/2018 | Newendorp et al. | G10L 15/22 |
| 2018/0342237 A1* | 11/2018 | Lee et al. | G10L 15/08 |
| 2019/0206389 A1* | 7/2019 | Kwon et al. | G10L 15/075 |
| 2021/0118425 A1* | 4/2021 | Pollet et al. | G10L 13/047 |

\* cited by examiner

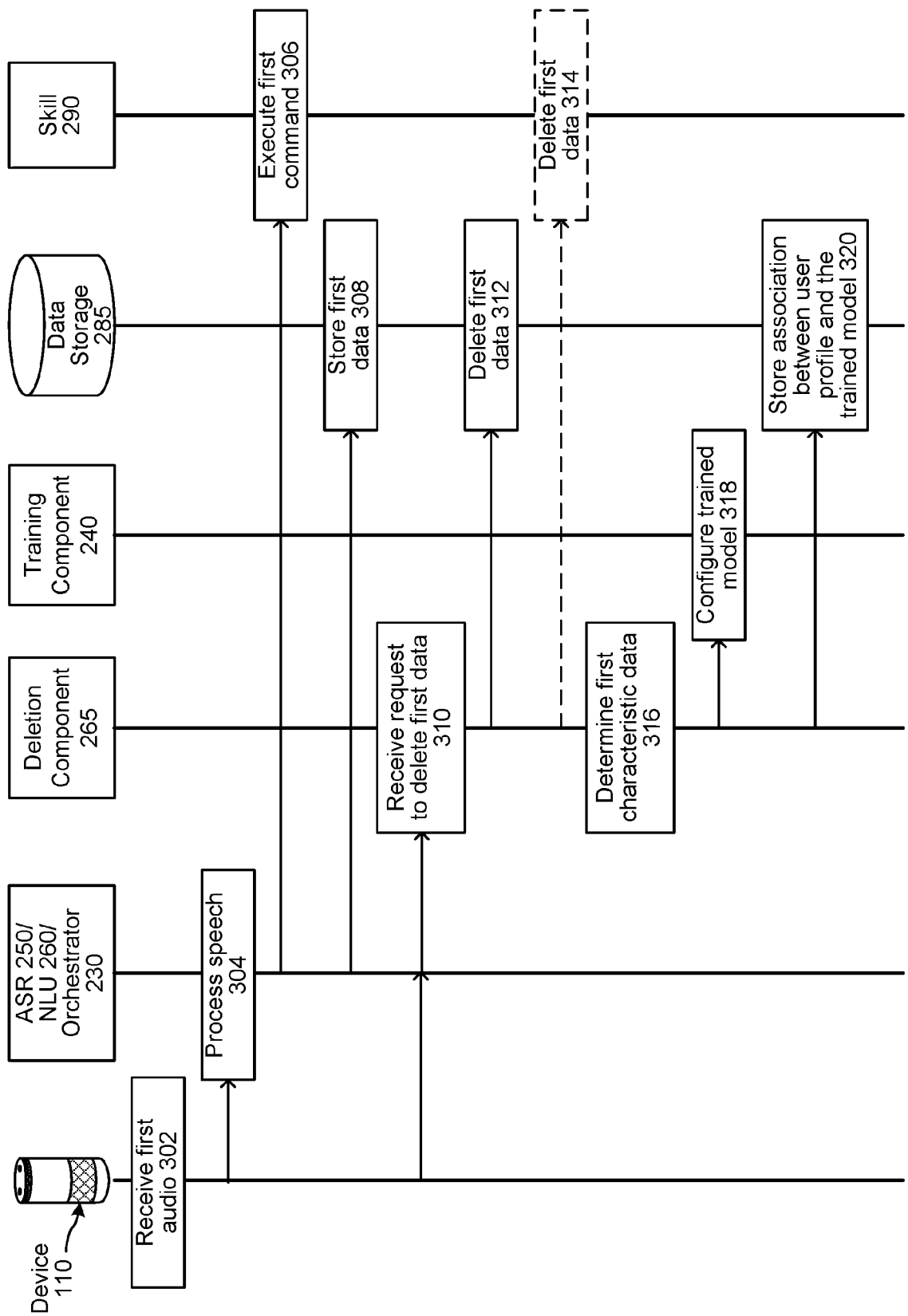

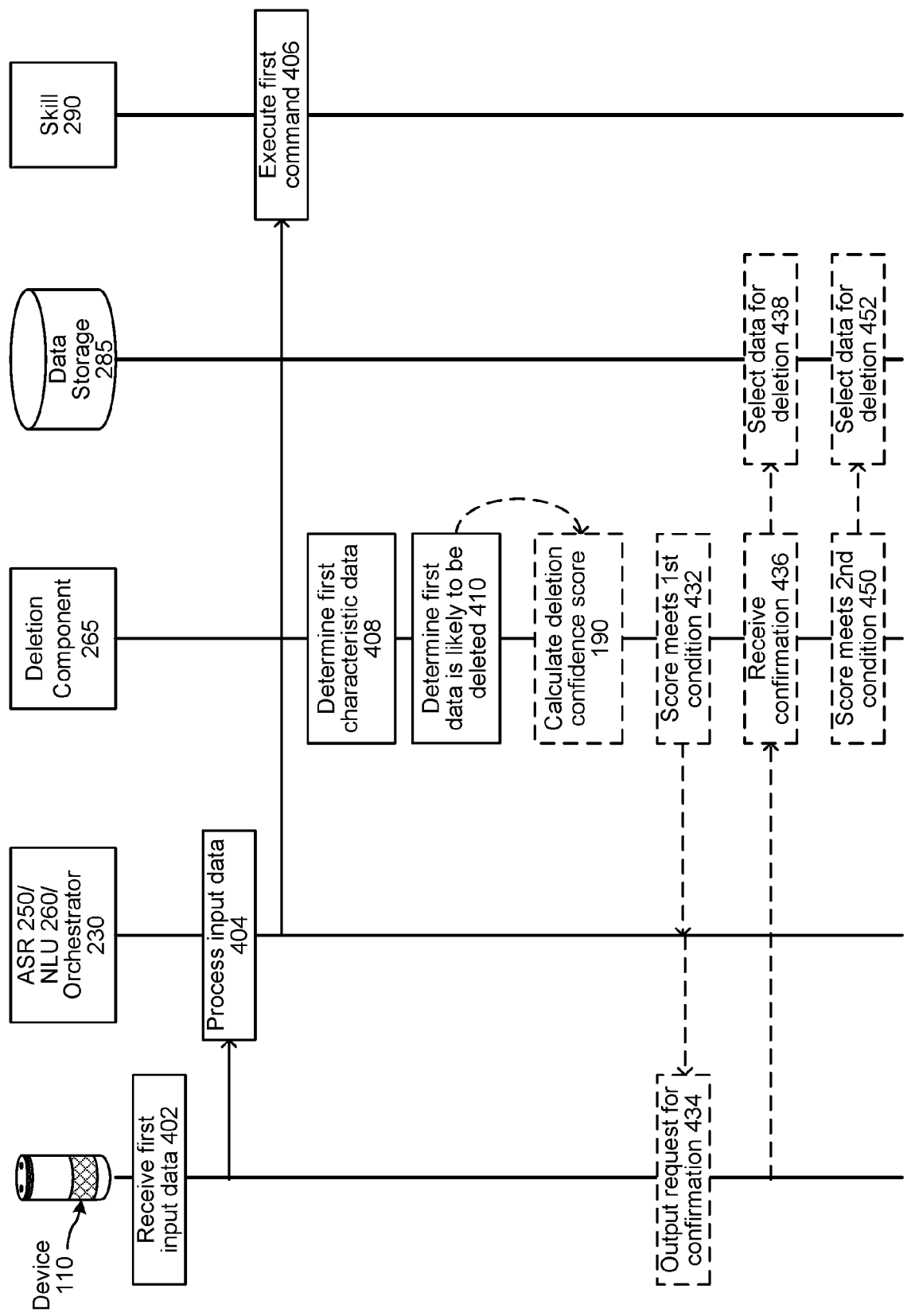

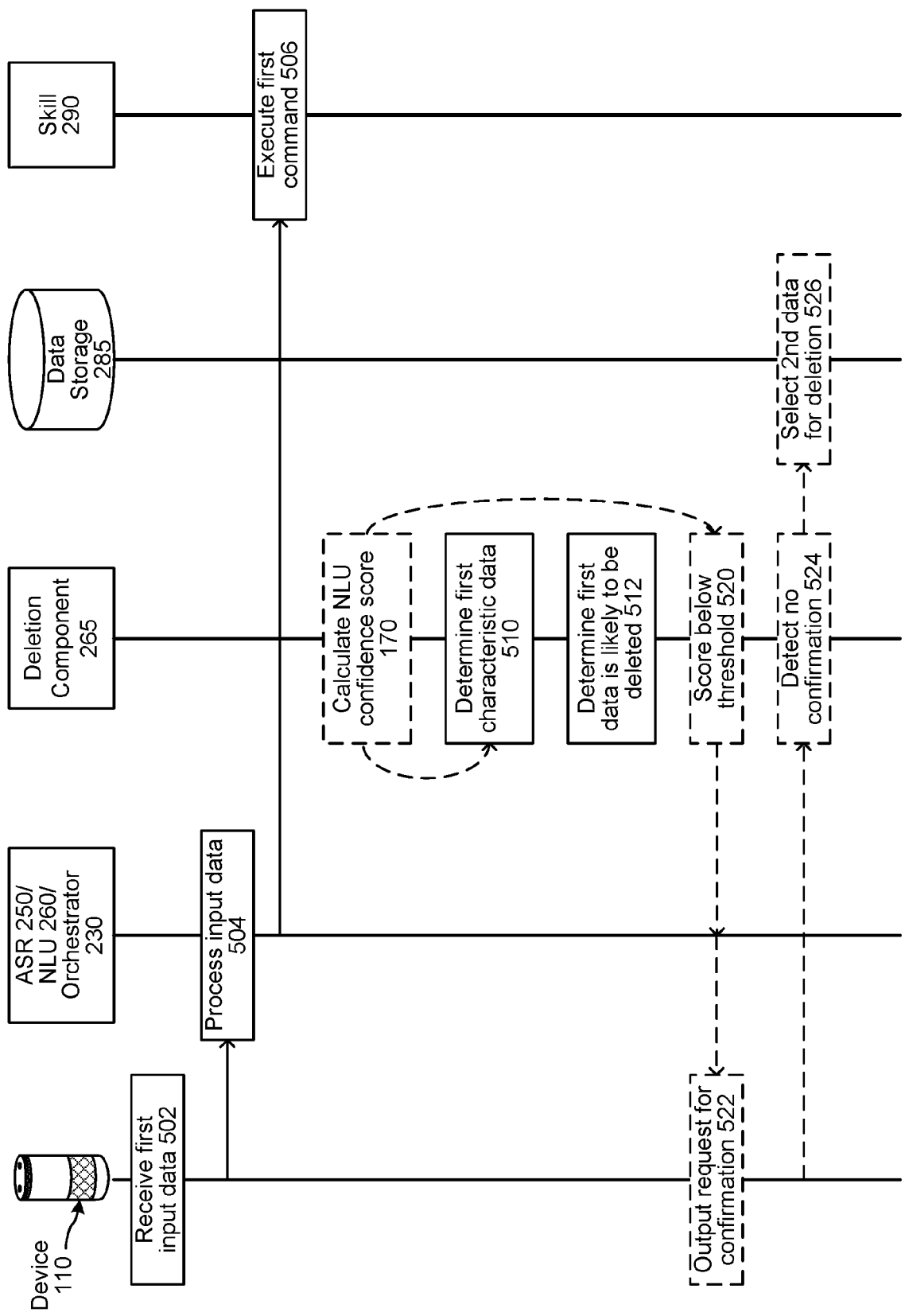

US 11,769,496 B1

PREDICTIVE DELETION OF USER INPUT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A and 3B show a signal flow diagram illustrating an example process for training a model for personalized, behavior-based predictive deletion of user input, and using the trained model to determine that user input is likely to be deleted, in accordance with embodiments of the present disclosure.

FIG. 4 shows a signal flow diagram illustrating a first example process for personalized, behavior-based predictive deletion of user input, in accordance with embodiments of the present disclosure.

FIG. 5 shows a signal flow diagram illustrating a second example process for personalized, behavior-based predictive deletion of user input, in accordance with embodiments of the present disclosure.

DETAILED DESCRIPTION

Figure 1:
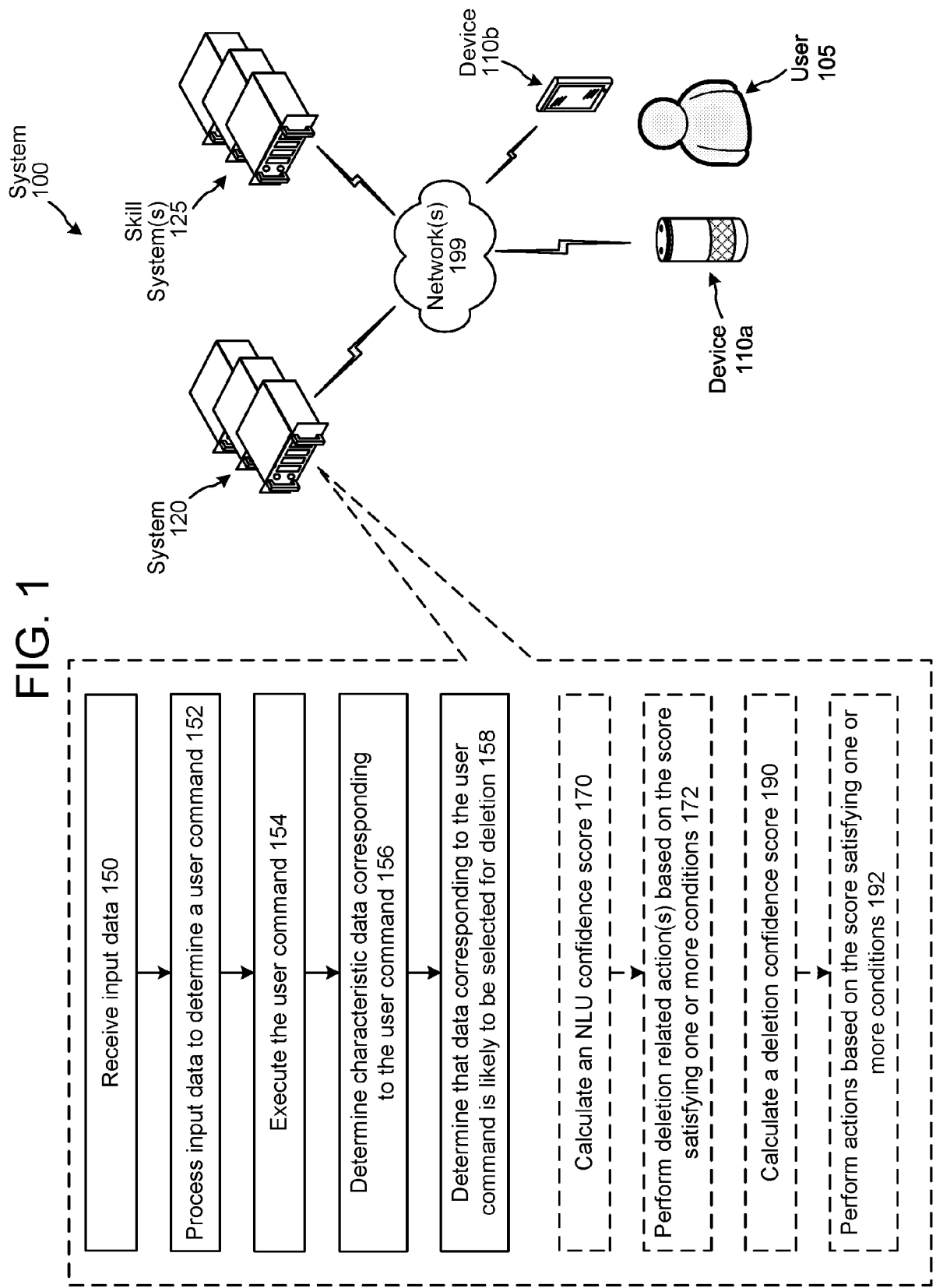
FIG. 1 illustrates a system for personalized, behavior-based predictive deletion of user input, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A natural language processing system may be configured to perform actions in response to natural language user inputs. For example, for the user input of "play Adele music," a natural language processing system may output music sung by an artist named Adele. For further example, for the user input of "turn on the lights," a natural language processing system may turn on "smart" lights associated with the user's profile. In another example, if a user asks "Alexa, what are some anniversary present ideas," the system may interact with a shopping skill to determine recommendations to output to a user.

To ensure user privacy, a system may enable users to delete previous input data stored on the system (whether those inputs were received via text or audio), along with other data that may correspond to such previous inputs. Allowing a user to delete items of data individually may give the user granular control over what information is stored about the user, thus improving privacy of the overall system. It would therefore be beneficial (assuming user permission is received to do so) to predictively, contextually determine when a particular user input (and corresponding data) is likely to be selected for deletion or would otherwise benefit from deletion, and flag the item for review by the user and/or programmatically delete it without receiving an explicit user instruction to do so.

Accordingly, offered herein are techniques and systems for providing for predictive recommendation for, and/or ultimate deletion of, user information that the system may have otherwise stored. The system can learn what types of user inputs to a system (such as Amazon's Alexa/ other voice user interface systems, Google's/other search systems, automobile navigation systems, Netflix's/other content systems, suggestions for gift purchases, etc.) are typically followed at some point by a request to delete information related to those inputs. The system can then configure at least one system component (e.g., train a model) to select user input and/or related data for possible deletion based on various characteristics of previous inputs selected for deletion and/or other operations of the system component / trained model. The model may consider various features such as the content of the user input, context of the user input, subsequent user behavior, similarity to previous user input deleted, similarity to pattern of deletions made by similar users, or other factors. Deletions need not necessarily be processed in real time / immediately after a user input is received, and may be processed minutes, hours, or days later depending on system configurations and/or user preferences. The system can handle deletions in several ways including flagging or otherwise queuing user input (and/or related data) for future deletion, suggesting deletion or requesting the user to confirm deletion, or (e.g., with prior user permission to do so) immediately deleting the user input data without further user input. The manner of handling deletions can depend on a deletion confidence score; that is, the more confident the system is that the user would wish to delete the user input, the more proactive the system may be. The system can employ an incremental learning model to train the model such that learning is not lost when user input is deleted.

FIG. 1 illustrates a system 100 for personalized, behavior-based predictive deletion of user input, in accordance with embodiments of the present disclosure. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more devices 110 local to a user 105, a natural language command processing system 120 in communication with one or more skill systems 125 connected across one or more networks 199. The natural language command processing system 120 may have or be associated with a deletion component 265, where the deletion component may operate one or more trained models 235 (shown in FIG. 2).

The device 110a may receive input audio corresponding to a spoken natural language user input originating from the user 105. The device 110a may generate audio data corresponding to the input audio and may send the audio data to the natural language command processing system 120. Alternatively, the device 110b may receive a text-based natural language user input from the user 105. The device 110b may generate text data corresponding to the input text and may send the text data to the natural language command processing system 120.

Either device 110 may send the audio data and/or text data to the natural language command processing system 120 via a companion application installed on the device 110. A companion application may enable the device 110 to communicate with the natural language command processing system 120 via the network(s) 199. An example companion application is the Amazon Alexa application that may be installed on a smart phone, tablet, or the like.

The natural language command processing system 120 may receive (150) input data (e.g., audio data or text data) representing a natural language user input for a user having a user profile. The input data can include, for example and without limitation, input audio data such as a voice command, typed or written input such as via keyboard or touchscreen, or any other type of user input conveying spoken word or textual input. The natural language command processing system 120 may process (152) the input data to determine a user command. User commands may include a request to perform a certain action locally, such as controlling environmental factors in a Smart Home system, or online, such as purchasing goods or checking the weather.

User recognition and other ASR/NLU operations are described further below with reference to FIGS. 6 through 9. The natural language command processing system 120 may execute (154) the user command. Commands may be processed by one or more of the device 110, the natural language command processing system 120, the skill system 125, or any other connected device or system. The natural language command processing system 120 may determine (156) characteristic data corresponding to the first user command. The characteristic data may take the form of a vector, array, glob, or any other appropriate data type or data structure. The characteristic data can include, for example and without limitation, information corresponding to, or processed from, the input data, the user command, and/or context or information related to the input data. Such information can include, for example and without limitation, the time of day, user recognition data XB95 (such as user ID, user profile ID or the like), device ID, device type, NLU output data (e.g., intent, skill ID, command type, domain, or the like), ASR output data (e.g., text data), user profile data (such as user profile characteristic data or other data accessible using a user profile), audio characteristics of the audio data 211, position data corresponding to the user input, message recipient, and/or confidence scores related to wakeword detection or command determination. The characteristic data may also include paralinguistic feature data that may be available to the system 120. For example, the characteristic data may also include sentiment data (for example data output by sentiment detection component 275, as discussed below). The characteristic data may also be based on data of other modalities beyond text and/or audio. For example, the characteristic data may be based on image data, video data, biometric data (for example obtained by a wearable device), presence data, and/or other sensor data available to the system 120, assuming user permission for accessing and using such data. Such characteristic data may correspond to the user input to perform the operations discussed herein.

The natural language command processing system 120 may process (158) the characteristic data using a deletion component 265 to determine that data corresponding to the user command is likely to be selected for deletion. The deletion component 265 can use a trained model 235 configured using at least one prior user command associated with the user profile. In some implementations, the natural language command processing system 120 can perform additional actions related to the deletion of input audio data and related data including calculating confidence scores, flagging or queueing data for deletion, and/or requesting user confirmation to delete. These and other operations are discussed in further detail below.

While processing the input data and executing the command generally occur in real time for most commands, the determining (156), processing (158), and subsequent operations based on the processing (158) need not happen in real time, and may in fact may occur seconds, minutes, hours, or days after receipt of the input data. When the data is determined to be likely to be selected for deletion, the data can be flagged for deletion or moved to a different memory or storage space. Until the flagging is resolved—either through selecting the data for deletion or removing the flag—the data may be sequestered or otherwise restricted from, for example, annotation, duplication, or incorporation into testing or training data. The natural language command processing system 120 and the deletion component 265 can be set with a conservative operating point to have a low false rate for determining that the data corresponding to the user command is likely to be selected for deletion. Depending on subsequent user action—e.g., deleting the data, ignoring a suggestion to delete, or removing a flag designating the data for deletion—the natural language command processing system 120 and deletion component 265 can auto-tune at a per-user lever with a reinforcement learning style approach. In some implementations, the system can refine the deletion component 265 and the trained model 235 incrementally based on additional deletions, and prior to executing the deletions, so that learning is not lost.

The trained model 235 can be a model created with data related to deletion activity for the purpose of detecting patterns in deletion activity. The deletion component 265 can use the trained model 235 to predict the likelihood that received data will be selected for deletion. The trained model 235 can be configured based on one or more factors including information intrinsic to the input data, behavioral indicators, previous deletions associated with the user profile, and commonalities with other user profiles sharing certain affinities.

In some implementations, the deletion component 265 can make deletion predictions based upon information intrinsic to the input data. For example, if the input data concerns sensitive topics such as healthcare, legal issues, or personal matters, the deletion component 265 may, based on training data the trained model 235 has been configured with, recognize a high likelihood that input data related to those topics is likely to be deleted. The deletion component 265 may thus return an indication that such input data is likely to be selected for deletion, even in absence of (or in addition to) other factors.

In some implementations, the trained model 235 can be configured with data related to behavioral indicators. For example, if a user command or user commands from a user profile pertain to shopping for goods not typically associated with profiles similar to that user's profile, those user commands may correspond to shopping for gifts. The trained model 235 may be configured to recognize relationships between data representing user characteristics and product categories. For example, training data may include examples where mismatches between user profile characteristics such as data regarding age, income, gender, hobbies, etc. and product information such as data regarding product category and target market segments correspond with user deletions of input data. The trained model 235 may also be configured with data correlating deletion behavior with data regarding timing; for example, examples where deletion activity correlates with notable dates, such as user input data associated with windows of time preceding a gift-giving holiday, birthday, anniversary, etc. The trained model 235 may thus indicate an elevated probability of deletion when provided with characteristic data having similar features.

The deletion component 265 may factor additional user behaviors detected following receipt of the initial input data. For example, if the natural language command processing system 120 receives first input data, initiates a first action in response, and abruptly receives second input data or a request to cancel the action, the user may not have intended to issue the command that the natural language command processing system 120 acted upon. Thus, the deletion component 265 may indicate that the first input data is likely to be deleted. Similarly, if the natural language command processing system 120 has low confidence in its interpretation (e.g., an NLU hypothesis comprising an intent indication, named entity recognition results, or the like as discussed below) of received user input, it may request clarification from the user. Any response received, or lack of response received, can be used as additional behavioral indicators.

In some implementations, the trained model 235 can be configured to take into account data representing context information associated with the received input data. For example, the trained model 235 may take into account data representing a device type, whether the device is public or private, the time of day, whether other users are present, whether the speaker is a primary user of the device or a guest user, etc. For example, the trained model 235 may indicate that the presence of other people at the time input data is received reduces the likelihood that the input data will be selected for deletion, since such input data is not likely personal or private in nature. In another example, the trained model 235 may indicate that, for a given user profile, input data from guest users is more or less likely to be deleted, depending on the particular host user represented by the user profile In some implementations, the trained model 235 can be configured both with data associated with the user profile as well as data associated with other user profiles. This can allow the trained model 235 to function in a sparse data scenario when it has little or no training data corresponding to the user profile to work with. The trained model 235 can be trained using data corresponding to multiple or many user profiles. Based on the diverse training data, the trained model 235 can be configured to detect patterns in deletion activity among various user profiles. In some cases, the patterns may be based on user profile characteristics that are common across a group of users, for example the user being a member of a particular affinity group. For example, respective user profile characteristics may be based on one or more factors one user profile may have in common with another user profile (or group of profiles), with example factors including age, family status, profession, income, location, hobbies, interests, behavior with regard to the system 120, etc. For example, the trained model 235 may detect that married individuals within a certain age bracket and a certain income bracket may often delete input data related to a certain type of command or request, while single individuals within a different age bracket and a different income bracket may rarely delete such input data. The trained model 235 can take such patterns of deletion behavior into account when processing characteristic data to determine whether data corresponding to a user command having that characteristic data is likely to be selected for deletion. A user may provide and control what user profile characteristics are considered by the system for such operations with respect to the user. For example a user may enable the system to consider certain of the user's user profile characteristics (for example, age) but disable the system from considering another of the user's user profile characteristics (for example, income). If at any time the user would like to stop (or start) using other user profile characteristics the user may instruct the system accordingly.

In some implementations, the natural language command processing system 120 may calculate (170) a score representing an NLU confidence associated with the user command determined during the processing (152). The NLU confidence score can be included in the characteristic data used to determine that the user command is likely to be selected for deletion. Likewise, the system can include the NLU confidence score in the training data for training the trained model 235. In addition, the natural language command processing system 120 may perform (172) one or more deletion-related actions depending on whether the NLU confidence score satisfies (or fails to satisfy) one or more conditions—the rationale being that the command may have been misinterpreted or received erroneously. For example, if the system's confidence in the user command is low—i.e., the NLU confidence score is less than a threshold—the natural language command processing system 120 can request user confirmation of the user command. In absence of receiving the requested confirmation, natural language command processing system 120 can queue the input data for deletion.

In some implementations, the natural language command processing system 120, in addition to determining (158) that the data corresponding to the user command is likely to be selected for deletion, can further include calculating (190) a score representing a confidence that the data corresponding to the user command is likely to be selected for deletion. This score may be determined, for example, using trained model 235 discussed below. For example, if the deletion score exceeds a first threshold, the natural language command processing system 120 can request user confirmation to delete the data; and, if the deletion score exceeds a second threshold, the natural language command processing system 120 can queue the data for deletion without the user necessarily expressly requesting to delete the data. In an example operation, the natural language command processing system 120 may calculate (190) a score representing a confidence the data corresponding to the first user command is likely to be selected for deletion. Depending on the score, the natural language command processing system 120 may perform (192) one or more actions. Alternatively the system 120 may take no action depending on the score. For example, the natural language command processing system 120 may determine whether the score satisfies one or more conditions. If the score satisfies a first condition, for example by exceeding a first threshold, the natural language command processing system 120 may request user confirmation to delete the first input data. Upon receiving user confirmation to delete the first input data, the natural language command processing system 120 can select the first input data for deletion. If the score satisfies a second condition, for example exceeding a second threshold, the natural language command processing system 120 can select the first input data for deletion; i.e., without obtaining user confirmation.

In some implementations, the natural language command processing system 120 can receive the input data from a device associated with the user profile; for example, a voice activated device. Such devices typically receive input data following a wakeword. The device or the natural language command processing system 120 may calculate a confidence score associated with recognition of the wakeword. Such a wakeword confidence score may represent a confidence / likelihood that a wakeword was detected in input audio data. The wakeword confidence score may be determined, for example, by a wakeword detection component 220 operating on a device 110. The wakeword confidence score may be sent from the device 110 to the system 120. The system 120 may also process the input audio data to determine a wakeword confidence score, for example using its own wakeword detection component 220 or some other component. The natural language command processing system 120 can include the wakeword confidence score in the characteristic data used to determine whether the input data is likely to be selected for deletion. For example, a lower wakeword confidence score can indicate that the user input was received erroneously. In some implementations, the natural language command processing system 120 can queue erroneously received input data for deletion. In some implementations, the natural language command processing system 120 can request user confirmation of the input data and proceed accordingly; i.e., either by queueing the input data for deletion in absence of confirmation, or proceeding as normally if the received command is confirmed.

In some implementations, the system can employ incremental learning where a training component 240, described in further detail below with reference to FIG. 2, continuously updates the trained model 235 based on new data. For example, the training component 240 can refine the trained model 235 based on subsequent interactions between a user and the system. Applying incremental learning has the benefit that the training component 240 can update the trained model 235 based on additional interactions, and the trained model 235 can retain those updates even when the source data—e.g., the input data and certain data resulting from processing the input data—is deleted predictively or upon user request. The training component can update the trained model 235 at the per-user level, at a user-type level, and/or globally. In an example process, the system may receive a second user command to delete the first input data. The training component 240 may process the trained model 235, the input data, the characteristic data, and a subsequent user command to generate a second trained model 235. The system can then delete the first input data.

Further details of the system 100 configured for personalized, behavior-based predictive deletion of user input are explained below with reference to FIGS. 3A, 3B, 4, and 5, following a discussion of the overall system 100 of FIG. 2. The various components may be located on same or different physical devices. Communication between various components may occur directly or across a network(s) 199.

Figure 2:
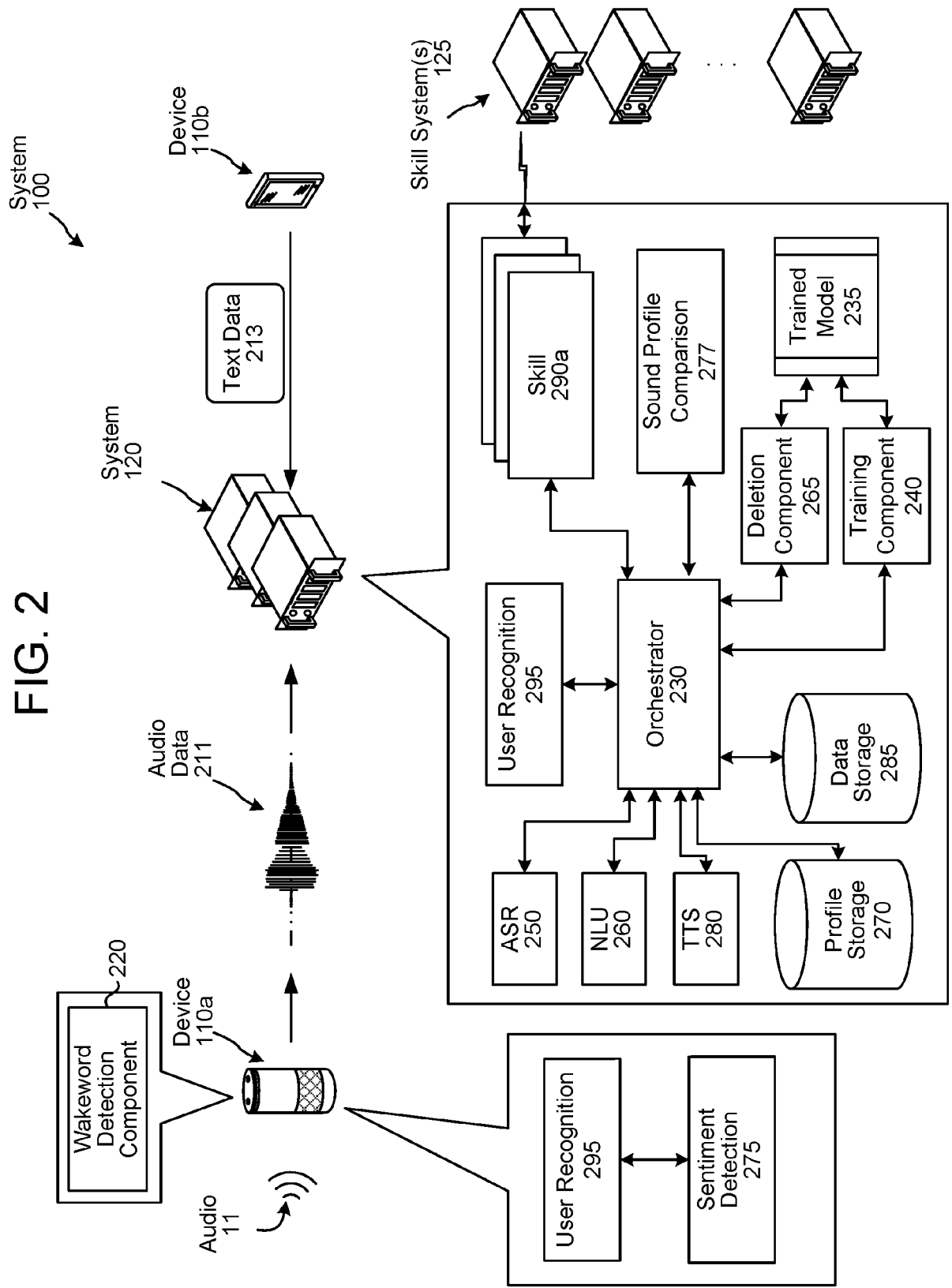
FIG. 2 is a conceptual diagram of components of a natural language processing system, in accordance with embodiments of the present disclosure.

FIG. 2 is a conceptual diagram of components of a natural language command processing system 120, in accordance with embodiments of the present disclosure. As shown in FIG. 2, an audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the natural language command processing system 120. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN) / recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the natural language command processing system 120. The audio data 211 may include data corresponding to the wakeword, or the device 110a may remove the portion of the audio corresponding to the wakeword prior to sending the audio data 211 to the natural language command processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based natural language user input. The device 110b may generate text data 213 representing the text-based natural language user input. The device 110a may send the text data 213 to the natural language command processing system 120. The orchestrator component 230 may receive the text data 713.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data, and returns a corresponding user command to the orchestrator component 230. That is, the NLU component 260 determines one or more semantic meanings associated with the phrase(s) or statement(s) represented in the text data based on words represented in the text data. The NLU component 260 determines an intent representing an action that a user desires be performed as well as pieces of the text data that allow a device (e.g., the device 110, the natural language command processing system 120, a skill 290, a skill system 125, etc.) to execute the intent. For example, if the text data corresponds to "play Adele music," the NLU component 260 may determine an intent that the natural language command processing system 120 output music and may identify "Adele" as an artist. For further example, if the text data corresponds to "what is the weather," the NLU component 260 may determine an intent that the natural language command processing system 120 output weather information associated with a geographic location of the device 110. In another example, if the text data corresponds to "turn off the lights," the NLU component 260 may determine an intent that the natural language command processing system 120 turn off lights associated with the device(s) 110 or the user(s) 105. The NLU component 260 may output NLU data (which may include tagged text data, indicators of intent, indicators of entities, indicators of slots, indicators of skills, etc.).

As described above, the natural language command processing system 120 may perform speech processing using two different components (e.g., the ASR component 250 and the NLU component 260). One skilled in the art will appreciate that the natural language command processing system 120, in at least some examples, may implement a spoken language understanding (SLU) component that is configured to process the audio data 211 to generate NLU output data.

In some examples, the SLU component may be equivalent to the ASR component 250 and the NLU component 260. For example, the SLU component may process the audio data 211 and generate NLU output data. The NLU output data may include intent data and/or slot data. While the SLU component may be equivalent to a combination of the ASR component 250 and the NLU component 260, the SLU component may process audio data 211 and directly generate the NLU output data, without an intermediate step of generating text data (as does the ASR component 250). Thus, the SLU component may take the audio data 211 representing natural language speech and attempt to make a semantic interpretation of the natural language speech. That is, the SLU component may determine a meaning associated with the natural language speech and then implement that meaning. For example, the SLU component may interpret the audio data 211 representing natural language speech from the user 105 in order to derive an intent or a desired action or operation from the user 105. In some examples, the SLU component outputs a most likely NLU hypothesis (e.g., an indication of intent and NER results) recognized in the audio data 211, or multiple NLU hypotheses in the form of a lattice or an N-best list with individual hypotheses corresponding to confidence scores or other scores (such as probability scores, etc.).

The orchestrator component 230 receives the user command from the NLU component 260, and provides the user command and other data related to the input data to a deletion component 265, which determines characteristic data corresponding to the user command. The characteristic data may take the form of a vector, array, glob, or any other appropriate data type or data structure. The characteristic data can include, for example and without limitation, information related to, or processed from, the input data, the user command, and/or context or information related to the input data. The information can include, for example and without limitation, the time of day, user ID, user profile ID, device ID, device type, intent, skill ID, command type, domain, message recipient, and/or confidence scores related to wakeword detection or command determination. The deletion component 265 can provide the characteristic data to a trained model 235 for the purpose of determining that data corresponding to the user command is likely to be selected for deletion.

The natural language command processing system 120 includes a training component 240. The training component 240 is logic or software that can create and update the trained model 235 based on training data. The orchestrator component 230 can provide characteristic data and other data related to the user command to a training component 240 for the purpose of providing initial training of the trained model 235 or ongoing, incremental training of the trained model 235.

The trained model 235 is a construct generated by applying machine learning techniques to a training data set collected from records of user input and user deletion events. The training data can include vectors representing characteristic data as well as annotations indicating whether input data and/or processed data corresponding to the characteristic data was selected by a user for deletion. A machine learning algorithm can be applied to the training data to detect trends, correlations, and/or patterns in characteristic data labeled as corresponding to data selected for deletion or not selected for deletion. Once configured, the trained model 235 can return an indication of whether data corresponding to given characteristic data is likely to be selected for deletion. The indication returned by the trained model 235 can be in the form of a Boolean (yes/no) or one or more scores indicating a probability of deletion, a probability range, and/or a confidence score associated with the probability. Based on the score returned from the trained model 235, the deletion component 265, discussed further below, can determine whether the data should be preserved, flagged for possible deletion subject to user confirmation, queued for eventual predictive deletion, or immediately deleted.

The natural language command processing system 120 may include one or more skills 290. A skill may be software running on the natural language command processing system 120 that is akin to a software application running on a traditional computing device. That is, a skill 290 may enable the natural language command processing system 120 to execute user commands involving specific functionality in order to provide data or produce some other requested output. The natural language command processing system 120 may be configured with more than one skill 290. For example, a weather service skill may enable the natural language command processing system 120 to provide weather information, a car service skill may enable the natural language command processing system 120 to book a trip with respect to a taxi or ride sharing service, a restaurant skill may enable the natural language command processing system 120 to order a pizza with respect to the restaurant's online ordering system, etc. A skill 290 may operate in conjunction between the natural language command processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the natural language command processing system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The natural language command processing system 120 may be configured with a single skill 290 dedicated to interacting with more than one skill system 125.

Unless expressly stated otherwise, reference herein to a "skill" may include a skill 290 operated by the natural language command processing system 120 and/or skill operated by a skill system 125. Moreover, the functionality described herein as a skill may be referred to using many different terms, such as an action, bot, app, or the like.

The natural language command processing system 120 may include a TTS component 280. The TTS component 280 may generate audio data (e.g., synthesized speech) from text data using one or more different methods. Text data input to the TTS component 280 may come from a skill 290, a skill system 125, the orchestrator component 230, or another component of the natural language command processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system 120 may include a sound profile comparison component 277. The sound profile comparison component 277 may compare input audio data 2111 (or a representation thereof) to stored sound profiles corresponding to known sounds. This may be used to, for example, determine if input audio data represents non-user speech, for example a commercial that may include the wakeword, thus causing the device to trigger unnecessarily. If the sound profile comparison component 277 determines that input audio data matches a stored audio profile of, for example, a mass media event such as a television commercial, the system may cancel any further speech processing regarding the input audio data, delete the audio data, and/or instruct the device 110 to enter a sleep mode. Further details on operation of the sound profile comparison component 277 may be found below in reference to FIG. 12.

The natural language command processing system 120 may include a user recognition component 295 that recognizes one or more users associated with data input to the natural language command processing system 120. The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the natural language command processing system 120 in correlation with a user input, to stored biometric data of users. The user recognition component 295 may additionally or alternatively perform user recognition by comparing image data (e.g., including a representation of at least a feature of a user), received by the natural language command processing system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the natural language command processing system 120 and/or other systems.

In some implementations, however, 295 may be turned off, inactive, or otherwise not engaged to perform user recognition. In such cases, the natural language processing system may assign input audio data to a default account, or a user or group account associated with the device 110, or otherwise determine a user / group account to which to assign incoming data.

The natural language command processing system 120 may include profile storage 270. The profile storage 270 may include a variety of information related to individual users, groups of users, devices, etc. that interact with the natural language command processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language command processing system 120 with permission to allow the skill to execute with respect to the user's inputs. If a user does not enable a skill, the natural language command processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

As shown in FIG. 2, the sentiment detection component 275 and the user recognition component 295 may be included in the device 110a. Alternatively, or in addition, all or portions of the sentiment detection component 275 and/or the user recognition component 295 may be included in device 110b and/or system 120. The device 110a may detect audio 11 and determine audio data 211 representing the audio 11. Upon receipt, the device 110a may send the audio data 211 to the user recognition component 295 to perform the operations described herein in relation to component 295, for example, including identifying a user profile corresponding to the audio data 211. The user recognition component 295 may send data to the sentiment detection component 275 to perform operations described herein.

The natural language command processing system 120 may include a data storage 285. The data storage 285 can be, for example, a volatile or non-volatile computer memory. The data storage 285 can store input data, command data, characteristic data, and data processed from the input data; for example, audio data, text data, confidence scores, annotations, etc. The orchestrator component 230 can communicate data to and from the data storage 285. When data is selected for deletion, either by a user or predictively by the deletion component 265 in conjunction with the trained model 235, the orchestrator component 230 can send notifications to the data storage 285 to flag data for deletion or to delete data immediately.

The natural language command processing system 120 includes a deletion component 265. The deletion component 265 can execute deletions or assist with executing deletions requested by a user. The deletion component 265 can delete or flag for deletion data in the data storage 285. In addition, the deletion component 265 can generate deletion requests for transmission to any skill 290 or skill systems 125 that may have received data designated for deletion.

Figure 3B:
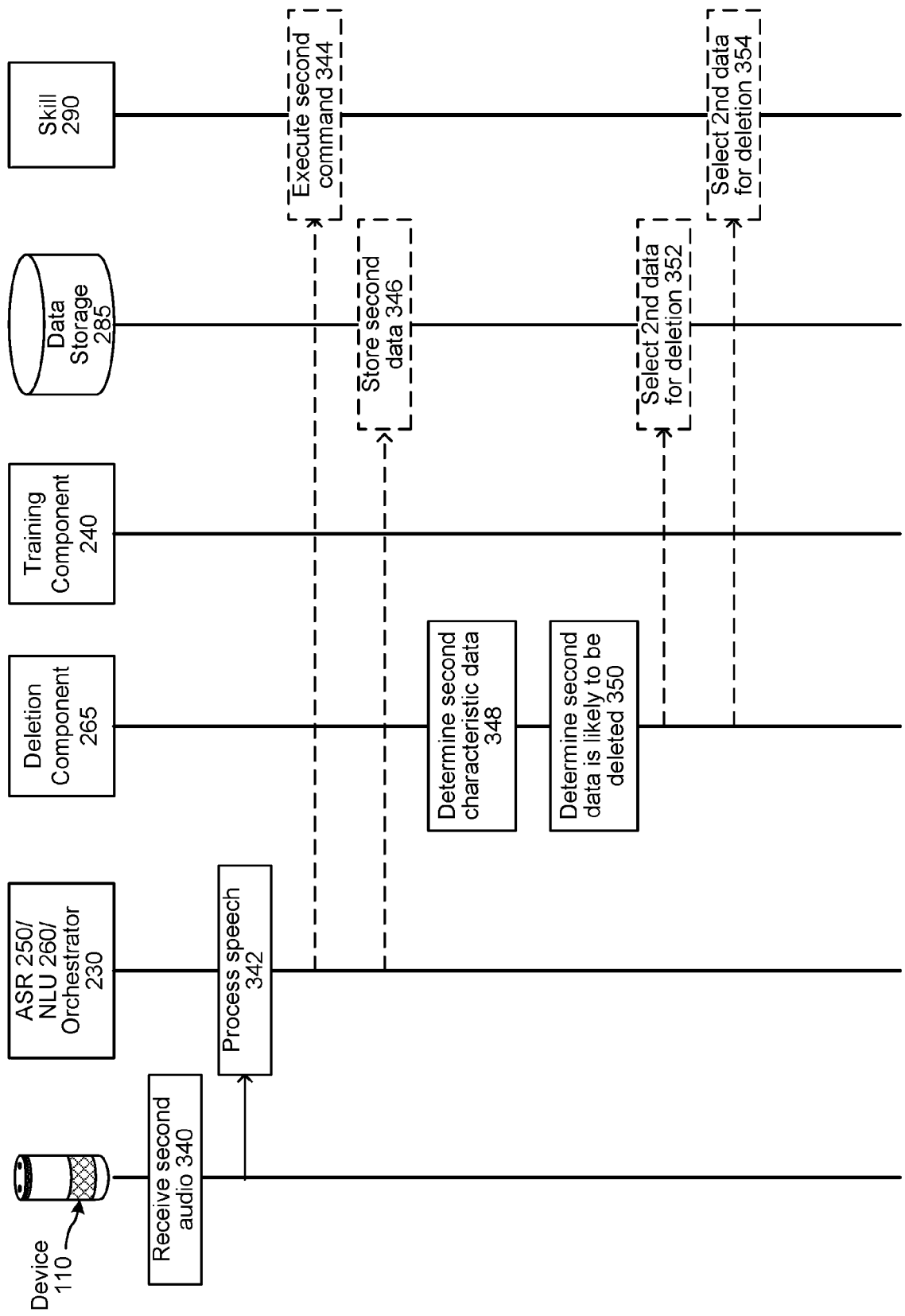

FIGS. 3A and 3B show a signal flow diagram illustrating an example process for training a model for personalized, behavior-based predictive deletion of user input, and using the trained model to determine that user input is likely to be deleted, in accordance with embodiments of the present disclosure. The diagram shows operations and communications among a device 110 and a natural language command processing system 120 including components such as ASR 250, NLU 260, orchestrator 230 and/or others that may assist with input processing / routing (not shown), a deletion component 265, a training component 240, a data storage 285, and a skill 290.

In the example process, the device 110, which can be a voice-activated device, receives (302) first audio representing a first utterance, and provides first audio data to the natural language command processing system 120. The device 110 (or in some cases components of the natural language command processing system 120) can associate the first audio data with a user profile. The ASR 250 and NLU 260 components perform (304) speech processing on the first audio data to determine a first user command. If the ASR 250 and NLU 260 components determine that the command pertains to a particular skill, an orchestrator component 230 of the natural language processing system 120 can send the first command to a skill 290 or a skill system 125, which can then execute (306) the command. The orchestrator component 230 can store (308) first data related to the processing of the first audio data in the data storage 285. The first data can include the first input audio data, text data resulting from ASR, an intent, slot data, a domain identifier, etc. The deletion component 265 receives (310) a request to delete the first data. The request can be in the form of a spoke command to the device 110, a typed command from the device 110 or another device, or via an administrator or agent of the system such as a customer service representative acting on a user request. The deletion component 265 causes the first data to be deleted (312) from the data storage 285. In some implementations, the deletion component 265 can additionally request that one or more skills delete (314) any relevant data previously received. The deletion component 265 can determine (316) first characteristic data associated with the user command, and send the first characteristic data to the raining component 240. The training component 240 can configure (318) or refine a trained model 235 using the characteristic data and the knowledge that first data corresponding to the characteristic data was selected for deletion. The deletion component 265 can store (320) association data indicating an association between the user profile and the trained model.

FIG. 3B continues the signal flow diagram of FIG. 3A. The device 110 can receive (340) second audio data representing a second utterance, and associate it with user profile. The ASR 250 and NLU 260 components can process the second audio data to determine (342) second data related to processing of the second audio data. The second data can include the second input audio data, text data resulting from ASR, an intent, slot data, a domain identifier, etc. In some implementations, the orchestrator component 230 can send a second command corresponding to the second data to a skill 290 for execution (344), and store (346) the second data in the data storage 285. The orchestrator component 230 can determine (348) second characteristic data corresponding to the second audio data. The deletion component 265 can process the second characteristic data using the trained model 235 to determine (350) that the second data is likely to be selected for deletion. In some implementations, the deletion component 265 can flag (352) the second data for deletion in the data storage 285, and flag (354) the second data for deletion from one or more skills 290.

In some implementations, training component 240 can refine the trained model 235 based on information related to previous user requests to delete data in a process of incremental learning. For example, the training component 240 can process the trained model 235, the first input data, the first characteristic data, and the request to delete the first data to generate a second trained model. The second trained model can represent an updated version of the first trained model 235. Following the generation of the second trained model, the deletion component 265 can delete the first data. In this manner, the trained model 235 can benefit from the information contained in the first data and subsequent decision to delete the first data, despite the deletion of the first data.

In some implementations, the natural language command processing system 120 receives additional useful information from the device 110. For example, the device 110 may provide, along with the audio data, a score representing a likelihood that the device 110 detected an appropriate wakeword in association with the audio data. The deletion component 265 can include the score in the characteristic data. The deletion component 265 and the trained model 235 can thus take into account, and learn from, the wakeword confidence score when determining whether data is likely to be selected for deletion. For example, a lower wakeword confidence score may indicate a possibility that the audio data was unintentionally captured, thus the trained model 235 may return a higher probability of the data being selected for deletion.

In some implementations, the natural language command processing system 120 may seek clarification or confirmation with respect to a user command determined from user input data. User behavior in response to a request for clarification or confirmation can be used as an additional factor in determining whether data corresponding to the user input data is likely to be selected for deletion. For example, following speech processing of second audio data to determine a second user command, the natural language command processing system 120 can calculate a score representing a confidence of the speech processing; for example, an NLU confidence associated with the second user command. If the score fails to satisfy a condition— e.g., fails to exceed a threshold—the natural language command processing system 120 can request user confirmation of the second user command. If the natural language command processing system 120 detects that no user confirmation of the second user command follows, the orchestrator component 230 can flag the second data for deletion.

FIG. 4 shows a signal flow diagram illustrating a first example process for personalized, behavior-based predictive deletion of user input, in accordance with embodiments of the present disclosure. The diagram shows operations and communications among a device 110 and a natural language command processing system 120 including ASR 250 and NLU 260 components, a deletion component 265, a training component 240, a data storage 285, and a skill 290 In the example process, the device 110 receives (402) first input data. The first input data can include text and/or audio data converted from speech. The device 110 (or in some cases the natural language command processing system 120) can associate the first input data with a user profile. The ASR 250 and NLU 260 components perform (404) processing on the first input data to determine a first user command. An orchestrator component 230 of the natural language command processing system 120 can execute (406), or cause to be executed, the first user command; for example, with the assistance of the skill 290 or skill system 125. The deletion component 265 can determine (408) first characteristic data corresponding to the first user command. The deletion component 265 can process the first characteristic data using the trained model 235, which can correspond to at least one prior user command associated with the first user profile, to determine (410) that data corresponding to the first user command is likely to be selected for deletion.

In some implementations, the deletion component 265 can determine a score representing a confidence the data corresponding to the first user command is likely to be selected for deletion, and take additional actions depending on the score satisfying (or failing to satisfy) one or more conditions. For example, the determination that the first user command is likely to be selected for deletion can additionally include calculating (190) the score representing a confidence the data corresponding to the first user command is likely to be selected for deletion and, in response to determining (432) that the score satisfies a first condition—e.g., exceeds a first threshold—the orchestrator can output (434) a request for user confirmation that the first user command should be deleted. Subject to receiving (436) such confirmation, the deletion component 265 can select (438) the first user command for deletion. If the deletion component 265 determines (450) that the score satisfies a second condition —e.g., exceeds a second threshold greater than the first threshold—the deletion component 265 can select (452) the first user command for deletion, even in absence of user confirmation.

In some implementations, the natural language command processing system 120 can calculate a confidence score representing a confidence in the determining of the first user command, and taking the confidence score into consideration in subsequent determinations related to deleting the relevant data. Accordingly, FIG. 5 shows a signal flow diagram illustrating a second example process for personalized, behavior-based predictive deletion of user input, in accordance with embodiments of the present disclosure. The diagram shows operations and communications among a device 110 and a natural language command processing system 120 including ASR 250 and NLU 260 components, a deletion component 265, a training component 240, a data storage 285, and a skill 290. In the example process, the device 110 receives (502) first input data. The first input data can include text and/or audio data converted from speech. The device 110 (or in some cases the natural language command processing system 120) can associate the first input data with a user profile. The ASR 250 and NLU 260 components perform (504) processing on the first input data to determine a first user command. The orchestrator component 230 execute (506), or cause to be executed, the first user command; for example, with the assistance of the skill 290 or skill system 125. The deletion component 265 calculates (170) an NLU confidence score representing a confidence in the determination of the first user command, for example by NLU component 260. The deletion component 265 determines (510) first characteristic data corresponding to the first user command, where the first characteristic data includes the score. The deletion component 265 can process the first characteristic data using the trained model 235, which can correspond to at least one prior user command associated with the first user profile, to determine (512) that data corresponding to the first user command is likely to be selected for deletion.

In some implementations, if the score representing a confidence in the determining of the first user command is low the natural language command processing system 120 can seek user clarification or confirmation. For example, the deletion component 265 can determine (520) that the score fails to satisfy a condition, such as failing to exceed a threshold. In response to the determination, the natural language command processing system 120 can output (522) a request for user confirmation of the second user command. In response to detecting (524) that no user confirmation of the first user command has been received, the deletion component 265 can select (526) the first input data for deletion.

Although FIGS. 4 and 5 illustrate taking certain actions with respect to a deletion confidence and/or NLU confidence, other actions may be taken based at least in part on other confidence scores. For example, if the system has determined that the user is likely to delete data related to a user input if the user had a certain sentiment at the time of the user input (for example, the user deletes data related to user inputs that occur when a user is angry), the system may user sentiment detection confidence to drive system operation. For example, if the system has determined that a certain confidence corresponding to a user having a certain sentiment at the time of the user input (for example score(s) 1030 / 1120 as determined by sentiment detection component 275 as discussed below in reference to FIGS. 10 / 11) the system may take certain actions such as output a request for confirmation (e.g., confirmation request 434 or 522), selecting data for deletion (e.g., 438, 452, 526), or other actions such as de-linking data from the user profile or the like as discussed herein.

Figure 6:
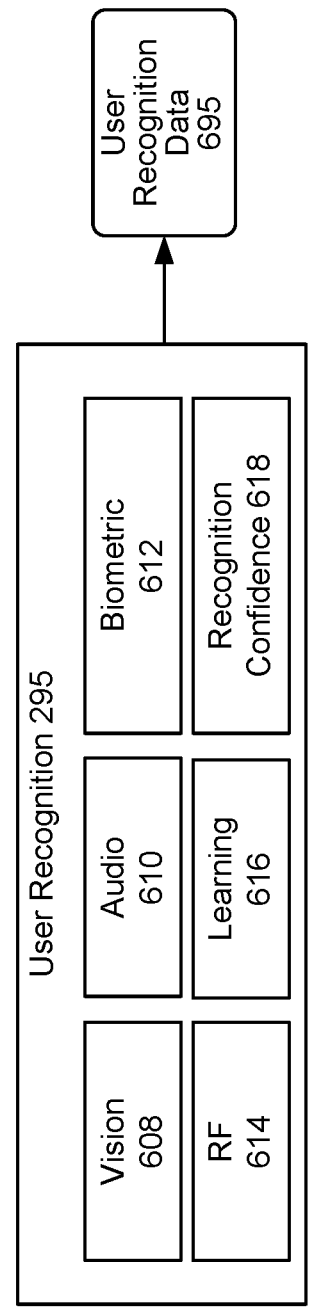
FIG. 6 is a schematic diagram of an illustrative architecture in which sensor data is combined to recognize one or more users, in accordance with embodiments of the present disclosure.

As described above, the system 120 may include a user recognition component 295. The user recognition component 295 may recognize one or more users using a variety of data. As illustrated in FIG. 6, the user recognition component 295 may include one or more subcomponents including a vision component 608, an audio component 610, a biometric component 612, a radio frequency (RF) component 614, a learning component 616, and a recognition confidence component 618. In some instances, the user recognition component 295 may monitor data and determinations from one or more subcomponents to recognize an identity of one or more users associated with data input to the system 120. The user recognition component 295 may output user recognition data 695, which may include a user identifier associated with a user the user recognition component 295 believes originated data input to the system 120. The user recognition component 295 may be used to inform processes performed by various components of the system 120 as described herein, including a deletion component 265 of the natural language command processing system 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may use determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by a device 110 the user is facing for purposes of identifying a user who spoke an input to the system 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the NPL system 120 for purposes of the system 120 determining who spoke a particular input. Such a registration may occur prior to, during, or after speaking of an input.

The learning component 616 may track the behavior of various users as a factor in determining a confidence level of the identity of the user. By way of example, a user may adhere to a regular schedule such that the user is at a first location during the day (e.g., at work or at school). In this example, the learning component 616 would factor in past behavior and/or trends in determining the identity of the user that provided input to the system 120. Thus, the learning component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695. The user recognition data 695 including the confidence level can, in turn, be provided by an orchestrator component 230 of the natural language command processing system 120 to the deletion component 265. The deletion component 265 can, in turn, use recognition data 695 to select a user-specific trained model. A user-specific trained model may be configured to make determinations customized for the particular user (e.g., based on behavior information and other data relevant to the user). The user-specific trained model may be trained using information specific to the user (e.g., behavior data for that specific user) and/or may be trained using data corresponding to characteristics of the user that may be shared with other users. A user-specific trained model may be linked to a user, for example being associated with the user's user profile. The deletion component 265 can include the recognition data 695 in the characteristic data used for determining a likelihood of deletion of data related to the data input.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of the system 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the system 120 for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the device 110 that captured the spoken user input).

Figure 7:
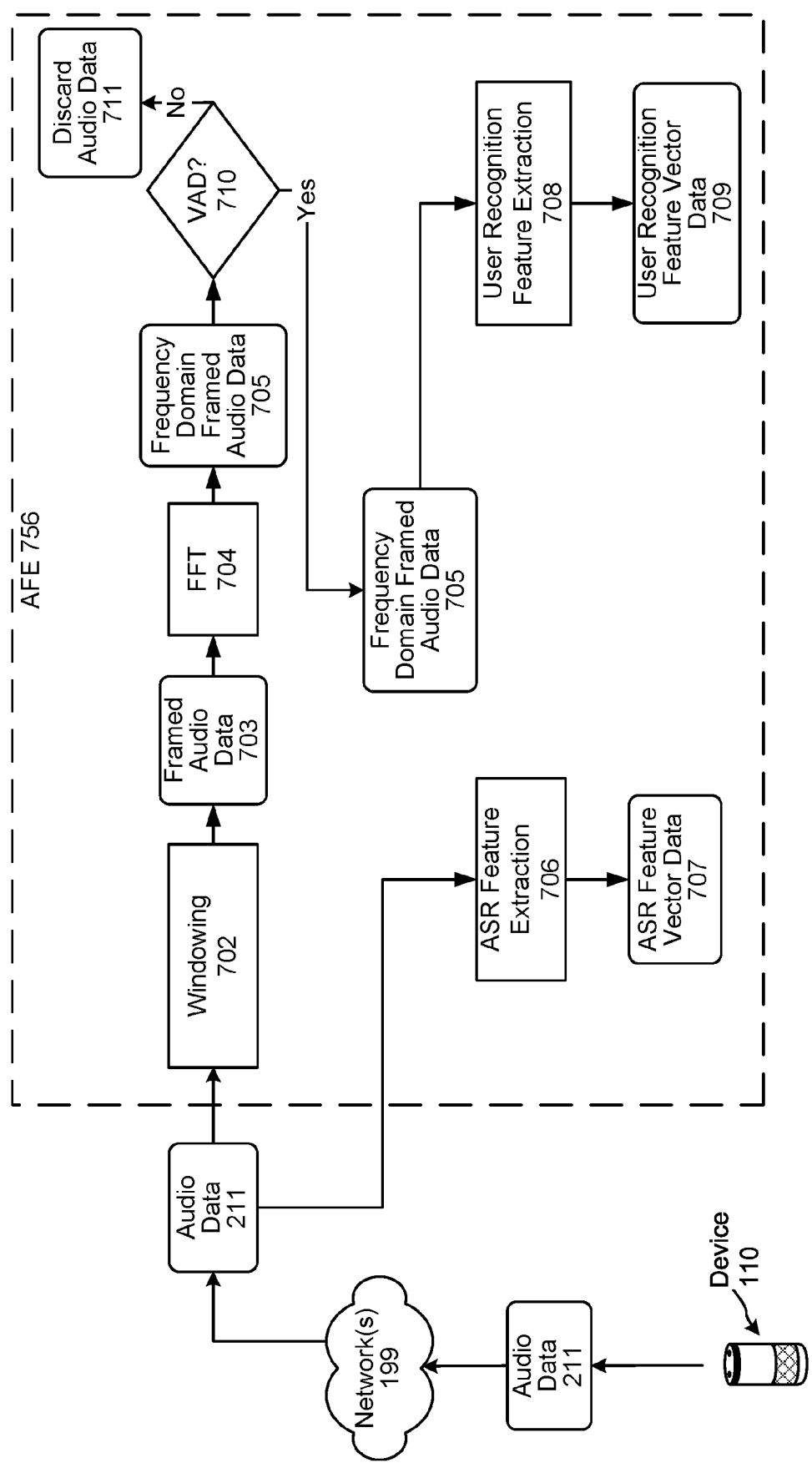
FIG. 7 is a flow diagram illustrating processing performed to prepare audio data for ASR processing and user recognition processing, in accordance with embodiments of the present disclosure.

FIG. 7 illustrates processing performed to prepare audio data for ASR processing and user recognition processing. As described, the device 110 sends audio data 211 through a network(s) 199 to the system 120 for processing. The system 120 may include an acoustic front end (AFE) 756 (or other component(s)) that performs various functions on the audio data 211 to prepare the audio data 211 for further downstream processing, such as ASR processing and/or user recognition processing. For example, the AFE 756 may perform (702) windowing functions on the audio data 211 to create framed audio data 703 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 756 may then perform (704) a fast Fourier transform (FFT) that converts the waveforms in each frame of the framed audio data 703 from its original domain (e.g., time) to a representation in a frequency domain (thereby creating frequency domain framed audio data 705). Audio processing techniques other than or in addition to FFT may be used to transform audio data (e.g., waveforms) into data that can be processed as needed.

The system 120 (through the AFE 756 or using another component) then detects (710) whether voice activity (i.e., speech) is present in the post-FFT waveforms (i.e., frequency domain framed audio data 705). The VAD detector 710 (or other components) may also be configured in a different order, for example the VAD detector 710 may operate on audio data 211 rather than on frequency domain framed audio data 705, may operate on ASR features, etc. Various different configurations of components are possible. If there is no speech in the audio data, the system 120 discards (711) the frequency domain framed audio data 705 (i.e., removes the audio data from the processing stream). If, instead, the system 120 detects speech in the frequency domain framed audio data 705, the system 120 performs user recognition feature extraction (708) on the frequency domain framed audio data 405. User recognition feature extraction (708) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 709). The feature extraction may continue until voice activity is no longer detected in the audio data, at which point the system 120 may determine that an endpoint of the speech has been reached.

ASR feature extraction (706) may be performed on all the audio data 211 received from the device 110. Alternatively (not illustrated), ASR feature extraction (706) may only be performed on audio data including speech (as indicated by the VAD 710). ASR feature extraction (706) and/or user recognition feature extraction (708) involve determining values (i.e., features) representing qualities of the frequency domain framed audio data 705, along with quantitating those features into values (i.e., feature vectors or audio feature vectors). ASR feature extraction (706) may determine ASR feature vector data 707 useful for ASR processing, and user recognition feature extraction (708) may determine user recognition feature vector data 709 (sometimes called an i-vector) useful for user recognition. The ASR feature vector data 707 and the user recognition feature vector data 709 may be the same feature vectors, different feature vectors, or may include some overlapping feature vectors. A number of approaches may be used to extract feature vectors from the frequency domain framed audio data 705, such as MFCCs, PLP techniques, neural network feature vector techniques, linear discriminant analysis, semi-tied covariance matrices, or other approaches known to those skilled in the art.

ASR feature vector data 707 may include a different audio feature vector for each audio frame. Thus, for one 25 ms long audio frame, the ASR feature extraction component 706 may output a single ASR feature vector. The ASR feature vectors 707 output by the ASR feature extraction component 706 may be output to the ASR component 250.

Depending on system configuration, the user recognition feature extraction component 708 may output multiple user recognition feature vectors, for example one such vector for each audio frame. Alternatively, the user recognition feature extraction component 708 may continue to input the frequency domain framed audio data 705 while the utterance is ongoing (e.g., before the endpoint of the speech is reached in the audio data 705). While the audio data 705 for the utterance is input, the user recognition feature extraction component 708 may accumulate or otherwise combine the audio data 705 as it comes in. That is, for a certain frame's worth of audio data 705 that comes in, the user recognition feature extraction component 708 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 708 may depend on what audio qualities are determined to be important for ultimate user recognition. Thus, the user recognition feature extraction component 708 may be trained to isolate and process data that is most useful for user recognition. The output of the user recognition feature extraction component 708 may thus include user recognition feature vector data 709 that includes values for features useful for user recognition. The resulting user recognition feature vector data 709 may then be used for user recognition.

Figure 8:
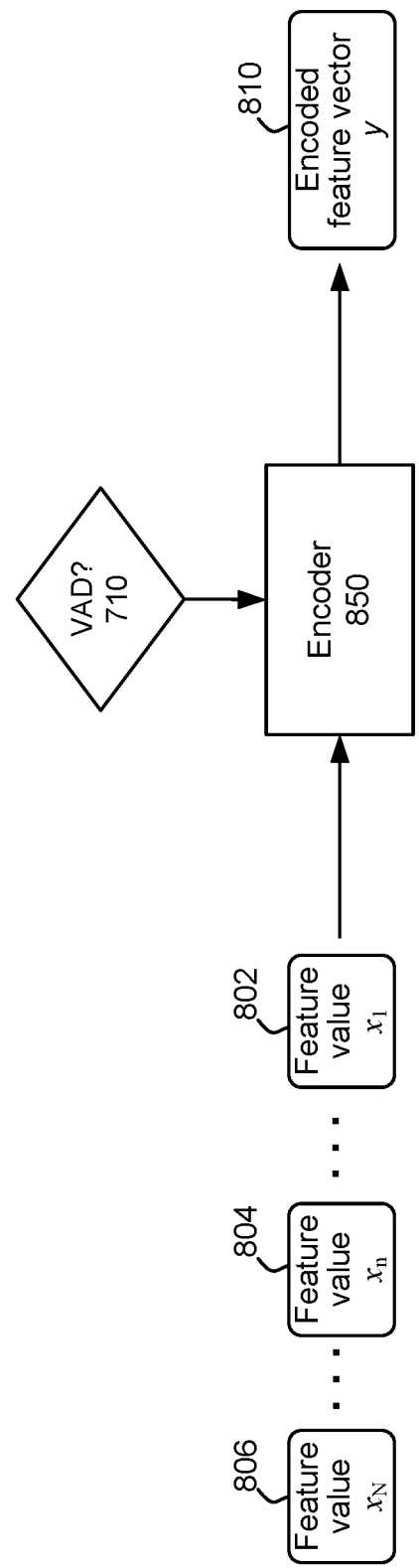
FIG. 8 is a diagram of a vector encoder, in accordance with embodiments of the present disclosure.

The user recognition feature vector data 709 may include multiple vectors, each corresponding to different portions of the utterance. Alternatively, the user recognition feature vector data 709 may be a single vector representing audio qualities of the utterance. Referring to FIG. 8, the single vector may be created using an encoder 850 that can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 8, feature values 802, 804, and 806 (which may include feature vectors of audio data 211, frequency domain framed audio data 705, or the like) may be input into an encoder 850 that will output an encoded feature vector 810 that represents the input feature values. The VAD 710 may be an input into the encoder 850 such that the encoder 850 may only operate when feature values input therein correspond to speech. The individual feature values (e.g., 802, 804, and 806) may correspond to specific audio frames. Regardless of how many feature values are input, any particular encoder 850 will be configured to output vectors of the same size, thus ensuring a continuity of output encoded vector size from any particular encoder 850 (though different encoders may output vectors of different fixed sizes) and enabling comparison of different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 850 may be implemented as a neural network (NN), recurrent neural network (RNN), GMM, or other model. One particular example is a long short-term memory (LSTM) RNN. There are a variety of ways for the encoder 850 to consume the encoder input, including but not limited to:
- linear, one direction (forward or backward),
- bi-linear, essentially the concatenation of a forward and a backward embedding, or
- tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 8 illustrates operation of the encoder 850. The input feature value sequence, starting with feature value $x_1$ 802, continuing through feature value $x_n$ 804, and concluding with feature value $x_N$ 806 is input into the encoder 850. The encoder 850 may process the input feature values as noted above. The encoder 850 outputs the encoded feature vector y 810, which is a fixed length feature vector of length F. Thus, the user recognition feature extraction component 808 may include an encoder 850 that receives audio feature values for a particular utterance as input, and outputs a fixed length encoded feature vector y 810, which may be the user recognition feature vector data 709. Thus, in certain system configurations, no matter how long the utterance is, or how many acoustic frames worth of feature values are input into the encoder 850, the output feature vector 810/709 will be of the same length, thus allowing for more ease of performing user recognition by the user recognition component 295. To allow for robust system operation, a final vector 810/709 may include many dimensions (e.g., several hundred), thus providing many data points for downstream consideration.

To determine the user recognition feature vector data 709, the system may (for example using the VAD detector 710) determine that voice activity is detected in input audio. This may indicate the beginning of the utterance, thus resulting in the system determining that the input utterance starts at a first point in audio data. Audio processing (for example by windowing 702, FFT 704, ASR feature extraction 706, user recognition feature extraction 708, ASR processing, or the like) may continue on the utterance audio data starting at the first point and continuing until the VAD detector 710 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 710, or other component, may signal the user recognition feature extraction component 708 when the beginpoint and/or endpoint is detected so that the user recognition feature extraction component 708 may begin processing audio data starting at the beginpoint and ending at the endpoint. Further, audio frames during the utterance that do not include speech may be filtered out by the VAD detector 710 and thus not considered by the ASR feature extraction component 706 and/or user recognition feature extraction component 708. The resulting accumulated / processed speech audio data for the utterance (from beginpoint to endpoint) may then be represented in a single feature vector for the user recognition feature vector data 709, which may then be used for user recognition.

Figure 9:
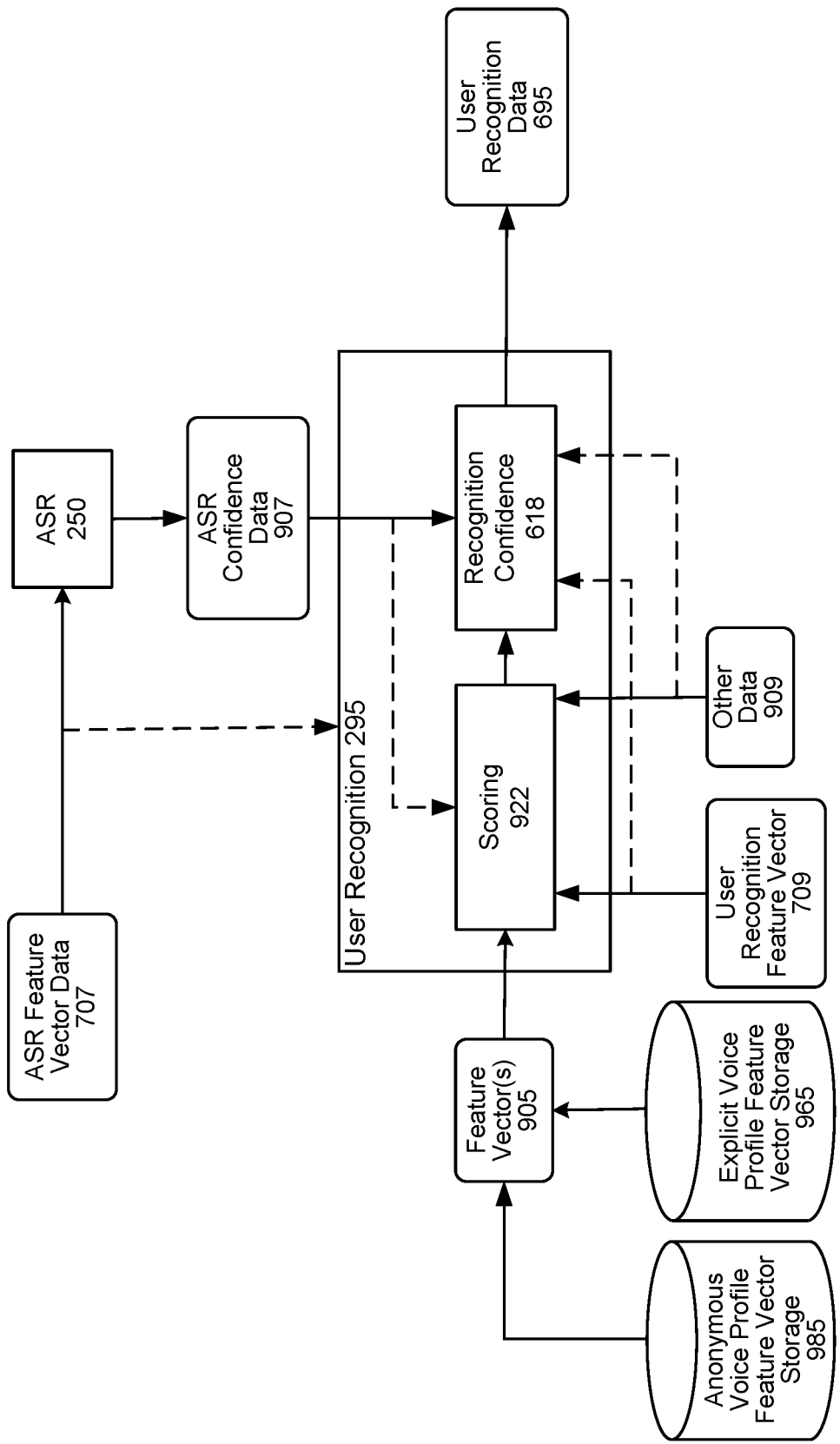
FIG. 9 is a system flow diagram illustrating user recognition processing, in accordance with embodiments of the present disclosure.

FIG. 9 illustrates user recognition as performed by the user recognition component 295. The ASR component 250 performs ASR on the ASR feature vector data 707 as described above. ASR confidence data 907 is passed to the user recognition component 295.

The user recognition component 295 performs user recognition using various data including the user recognition feature vector data 709, feature vectors 905 representing explicit and/or anonymous voice profiles, the ASR confidence data 907, and other data 909. The user recognition component 295 may then output user recognition confidence data 695, which reflects a certain confidence that the user input was spoken by one or more particular users. The user recognition confidence data 695 may include one or more user identifiers, one or more user profile identifiers, one or more explicit voice profile identifiers, and/or one or more anonymous voice profile identifiers. Each identifier in the user recognition confidence data 695 may be associated with a respective confidence value, representing a likelihood that the user input corresponds to the identifier. A confidence value may be a numeric or binned value.

A system may be configured to identify a user based on the user explicitly enrolling in the system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech in the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

The feature vector(s) 905 input to the user recognition component 295 may correspond to one or more anonymous voice profiles (stored in anonymous voice profile feature vector storage 985) and/or one or more explicit voice profiles (stored in explicit voice profile feature vector storage 965). The user recognition component 295 may compare the feature vector(s) 905 against the user recognition feature vector 709, representing the present user input, to determine whether the user recognition feature vector 709 corresponds to one or more of the feature vectors 905 of the anonymous and/or explicit voice profiles.

Each feature vector 905 may be the same size as the user recognition feature vector 709. Thus, for example, if the user recognition feature vector 709 is of size F (for example encoded by the encoder 850), a feature vector 905 may also be of size F.

To perform user recognition, the user recognition component 295 may determine the device 110 from which the audio data 211 originated. For example, the audio data 211 may be associated with metadata including a device identifier representing the device 110. Either the device 110 or the system 120 may generate the metadata. The system 120 may determine a group profile identifier associated with the device identifier, may determine user profile identifiers associated with the group profile identifier, and may include the group profile identifier and/or the user profile identifiers in the metadata. The system 120 may associate the metadata with the user recognition feature vector 709 produced from the audio data 211. The user recognition component 295 may send query the anonymous voice profile feature vector storage 985 and/or the explicit voice profile feature vector storage 965 for feature vectors 905 associated with the device identifier, the group profile identifier, and/or the user profile identifiers represented in the metadata. This limits the universe of possible feature vectors 905 the user recognition component 295 considers at runtime and thus decreases the amount of time to perform user recognition by decreasing the amount of feature vectors 905 needed to be processed. Alternatively, the user recognition component 295 may access all (or some other subset of) feature vectors 905 available to the user recognition component 295. However, accessing all feature vectors 905 will likely increase the amount of time needed to perform user recognition based on the magnitude of feature vectors to be processed.

The user recognition component may attempt to identify the user that spoke the speech represented in the audio data 211 by comparing the user recognition feature vector 709 to the received feature vector(s) 905. The user recognition component 295 may include a scoring component 922 that determines respective scores indicating whether the user input (represented by the user recognition feature vector 709) was spoken by one or more particular users (represented by the feature vector(s) 905). The user recognition component 295 may also include a confidence component 618 that determines an overall accuracy of user recognition operations (such as those of the scoring component 922) and/or an individual confidence value with respect to each user potentially identified by the scoring component 922. The output from the scoring component 922 may include a different confidence value for each received feature vector 905. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 922 and confidence component 618 may be combined into a single component or may be separated into more than two components.

The scoring component 922 and confidence component 618 may implement one or more trained machine learning models (such neural networks, classifiers, etc.) as known in the art. For example, the scoring component 922 may use probabilistic linear discriminant analysis (PLDA) techniques. PLDA scoring determines how likely it is that the user recognition feature vector 709 corresponds to a particular feature vector 905. The PLDA scoring may generate a confidence value for each feature vector 905 considered and may output a list of confidence values associated with respective user profile identifiers, anonymous voice profile identifiers, and/or explicit voice profile identifiers. The scoring component 922 may also use other techniques, such as GMMs, generative Bayesian models, or the like, to determine confidence values.

The confidence component 618 may input various data including information about the ASR confidence 907, speech length (e.g., number of frames or time of the user input), audio condition / quality data (such as signal-to-interference data or other metric data), fingerprint data, image data, or other factors to consider how confident the user recognition component 295 is with regard to the confidence values linking users to the user input. The confidence component 618 may also consider the confidence values and associated identifiers output by the scoring component 922. Thus, the confidence component 618 may determine that a lower ASR confidence 907, or poor audio quality, or other factors, may result in a lower confidence of the user recognition component 295. Whereas a higher ASR confidence 907, or better audio quality, or other factors, may result in a higher confidence of the user recognition component 295. Precise determination of the confidence may depend on configuration and training of the confidence component 618 and the models implemented thereby. The confidence component 618 may operate using a number of different machine learning models / techniques such as GMM, neural networks, etc. For example, the confidence component 618 may be a classifier configured to map a score output by the scoring component 922 to a confidence value.

The user recognition component 295 may output user recognition confidence data 695 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user recognition component 295 may output user recognition confidence data 695 with respect to each received feature vector 905. The user recognition confidence data 695 may include numeric confidence values (e.g., 0.0 - 1.0, 0-1000, or whatever scale the system is configured to operate). Thus, the user recognition confidence data 695 may output an N-best list of potential users with numeric confidence values (e.g., user profile identifier 123 - 0.2, anonymous voice profile identifier 234 - 0.8). Alternatively or additionally, the user recognition confidence data 695 may include binned confidence values. For example, a computed recognition score of a first range (e.g., 0.0 - 0.33) may be output as "low," a computed recognition score of a second range (e.g., 0.34 - 0.66) may be output as "medium," and a computed recognition score of a third range (e.g., 0.67 - 1.0) may be output as "high." Thus, the user recognition component 295 may output an N-best list of potential users with binned confidence value (e.g., user profile identifier 123 — low, anonymous voice profile identifier 234 —high). Combined binned and numeric confidence value outputs are also possible. Rather than a list of identifiers and their respective confidence values, the user recognition confidence data 695 may only include information related to the top scoring identifier as determined by the user recognition component 295. The user recognition component 295 may also output an overall confidence value that the individual confidence values are correct, where the overall confidence value indicates how confident the user recognition component 295 is in the output results. The overall confidence value may be determined by the confidence component 618.

The confidence component 618 may determine differences between individual confidence values when determining the user recognition confidence data 695. For example, if a difference between a first confidence value and a second confidence value is large (and, optionally) the first confidence value is above a threshold confidence value), then the user recognition component 295 is able to recognize a first user (associated with the feature vector 905 associated with the first confidence value) as the user that spoke the user input with a much higher confidence than if the difference between the confidence values were smaller.

The user recognition component 295 may perform thresholding to avoid incorrect user recognition results being output. For example, the user recognition component 295 may compare a confidence value output by the confidence component 618 to a threshold confidence value. If the confidence value does not satisfy (e.g., does not meet or exceed) the threshold confidence, the user recognition component 295 may not output user recognition confidence data 695, or may only include in that data 695 an indication that a user speaking the user input could not be recognized. Further, the user recognition component 295 may not output user recognition confidence data 695 until enough user recognition feature vector data 709 is accumulated and processed to verify a user above a threshold confidence. Thus, the user recognition component 295 may wait until a sufficient threshold quantity of audio data of the user input has been processed before outputting user recognition data 695. The quantity of received audio data may also be considered by the confidence component 618.

The user recognition component 295 may be defaulted to output binned (e.g., low, medium, high) user recognition confidence values. However, such may be problematic in certain situations. For example, if the user recognition component 295 computes a single binned confidence value for multiple feature vectors 905, the system may not be able to effectively determine which user originated the user input. In this situation, the user recognition component 295 may be configured to override its default setting and output numeric confidence values. This enables the system to determine a user associated with the highest numeric confidence value originated the user input.

The user recognition component may use other data 909 to inform user recognition processing. Thus, a trained model or other component of the user recognition component 295 may be trained to take other data 909 as an input feature when performing user recognition. The other data 909 may include a wide variety of data types depending on system configuration and may be made available from other sensors, devices, or storage. The other data 909 may include a time of day at which the audio data 211 was generated by the device 110 or received from the device 110, a day of a week in which the audio data 211 was generated by the device 110 or received from the device 110, etc.

The other data 909 may include image data and/or video data. For example, facial recognition may be performed on image data and/or video data received from the device 110 from which the audio data 211 was received (or another device). Facial recognition may be performed by the user recognition component 295, or another component of the system 120. The output of facial recognition processing may be used by the user recognition component 295. That is, facial recognition output data may be used in conjunction with the comparison of the user recognition feature vector 709 and one or more feature vectors 905 to perform more accurate user recognition.

The other data 909 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 909 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 909 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location / building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 909 may include additional data representing activity of a particular user that may be useful in performing user recognition. For example, if a user has recently entered a code to disable a home security alarm, and the audio data 211 was received from a device 110 represented in a group profile associated with the home, signals from the home security alarm about the disabling user, time of disabling, etc. may be reflected in the other data 909 and considered by the user recognition component 295. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 909 and considered by the user recognition component 295.

Depending on system configuration, the other data 909 may be configured to be included in the user recognition feature vector data 709 (for example using the encoder 850) so that all the data relating to the user input to be processed by the scoring component 922 may be included in a single feature vector. Alternatively, the other data 909 may be reflected in one or more different data structures to be processed by the scoring component 922.

The user recognition component 295 may use one or more different types of user recognition processing (e.g., as described with respect to FIG. 6) depending on the data available to the user recognition component 295 and/or a recognition condition (e.g., threshold recognition confidence level) that needs to be satisfied. In some examples, simply performing one type of user recognition processing may be sufficient. In other examples, two or more different types of user recognition processing may be necessary to recognition the user to a degree satisfying the recognition condition.

Figure 10:
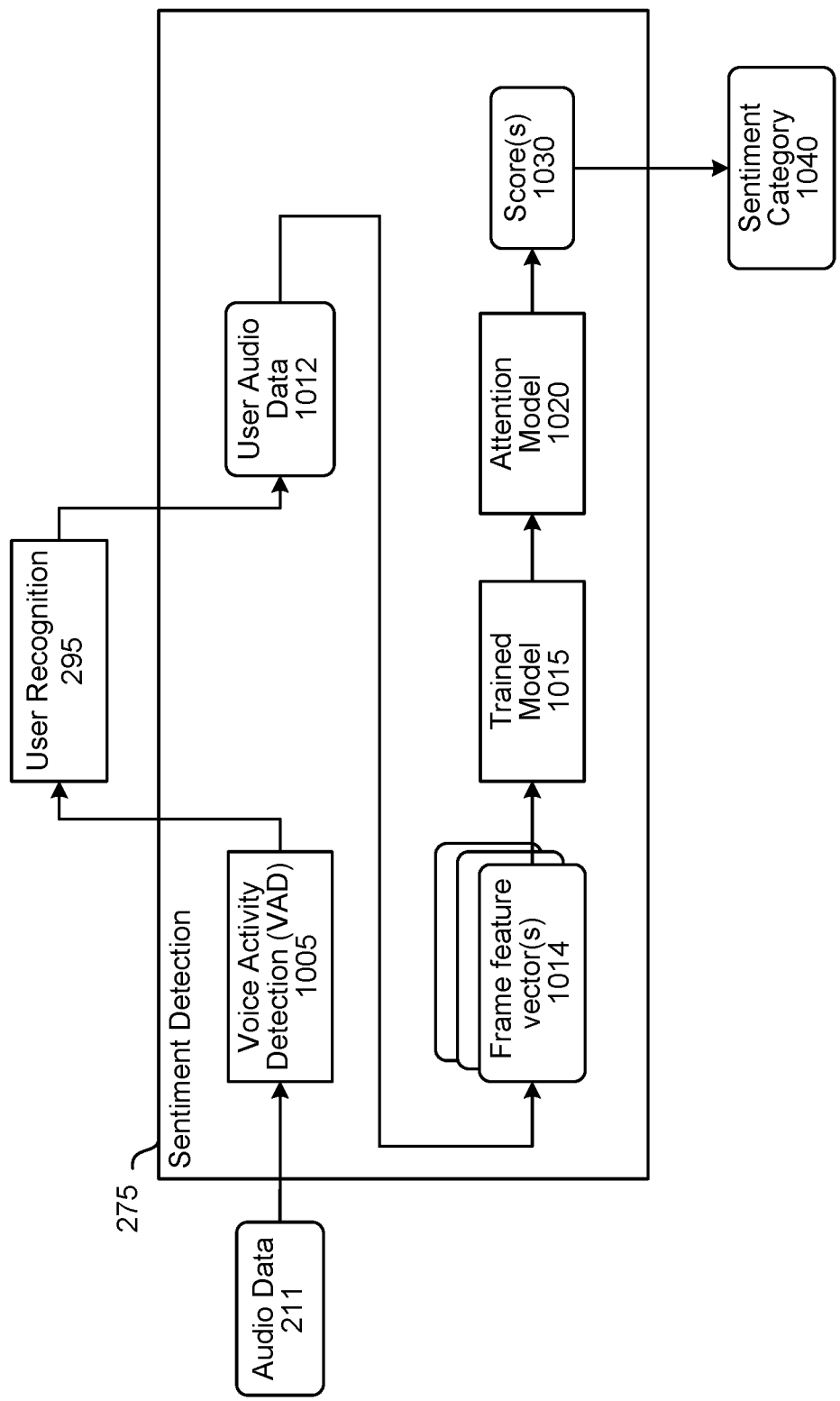
FIG. 10 is a conceptual diagram illustrating a sentiment detection component according to embodiments of the present disclosure.

FIG. 10 is a conceptual diagram illustrating a sentiment detection component according to embodiments of the present disclosure. The sentiment detection component 275 may include a voice activity detection (VAD) component 1005, a trained model 1015 and an attention model 1020. The audio data 211 captured by a device 110 may be inputted into the VAD component 1005. The sentiment detection component 275 may reside with a device 110a, with another device proximate to, and in communication with device 110 such as device 110b or with a remote device such as with system(s) 120. If the sentiment detection component 275 does not reside on the device 110a that is capturing audio, the sentiment detection component 275 may not necessarily include the VAD component 1005 (or may not necessarily include other components) and may or may not include other components as well. The precise composition of the sentiment detection component 275 depends on system configuration.

The VAD component 1005 may determine if the audio data 211 includes speech spoken by a human or voice activity by a human, and may determine a portion of the audio data 211 that includes speech or voice activity. The VAD component 1005 may send the portion of the audio data 211 including speech or voice activity to the user recognition component 295. The VAD component 1005 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 1005 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the sentiment detection component 275) may communicate with the sentiment detection component 275 to determine user audio data 1012 that corresponds to a particular user profile. The user recognition component 295 may recognize one or more users. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets / satisfies a threshold. If the confidence level for a portion of the input audio data is below a threshold, then the respective portion of input audio is discarded as it does not represent speech from the user associated with the user profile. If the confidence level for a portion of the input audio data meets / satisfies a threshold, then the respective portion of the input audio data is stored as the user audio data 1012.

The user audio data 1012 may be a portion of the audio data 211 that includes speech or one or more utterances from a particular user associated with the user profile. In other words, audio data representing a particular user's speech may be isolated and stored as the user audio data 1012 for further analysis. In an example embodiment, the user may be associated with or using the device 110, and may have provided permission to the system(s) 120 to record and analyze his or her voice / conversations to determine a sentiment category corresponding to the conversation.

Prior to performing further analysis on the user audio data 1012, the sentiment detection component 275 may confirm that the user has granted permissions to analyze speech spoken by the user for sentiment detection.

The user audio data 1012 may be inputted into an encoder 1150 (described further in relation to FIG. 10) to determine frame feature vector(s) 1014. The frame feature vector(s) 1014 may represent audio frame level features extracted from the user audio data 1012. One frame feature vector 1014 may represent features extracted for a window of 25 ms of audio, where the window slides or moves in increments of 10 ms to extract features represented by the next frame feature vector. In other embodiments, one frame feature vector 1014 may represent features corresponding to an individual word in the utterance. The sentiment detection component 275 may determine the portions of user audio data 1012 that correspond to individual words and extracts features from the respective portions of audio using the encoder 1150. The frame feature vector(s) 1014 may be derived by spectral analysis of the user audio data 1012.

In an example embodiment, the sentiment detection component 275 determines that the user audio data 1012 includes an entire utterance. That is, the sentiment detection component 275 may determine that a beginpoint of the user audio data 1012 corresponds to a beginpoint of an utterance, and an endpoint of the user audio data 1012 corresponds to an endpoint of the utterance. In this case, the frame feature vectors 1014 may represent the words in the entire utterance.

The trained model 1015 may process the frame feature vector(s) 1014 using a machine learning (ML) trained model. The trained model 1015 may be trained on acoustic and lexical features and may be a combined sentiment detection model. Even though only acoustic features may be available during runtime for sentiment detection, the trained model 1015 may be configured to infer some semantic and contextual features learned from lexical information during training.

The trained model 1015 may be a neural network, for example a bi-directional LSTM. The output of the trained model 1015 may be fed into an attention model 1020. The attention model 1020 may be a neural network, for example a recurrent neural network. The attention model 1020 may be configured to emphasize relevant portions of an input utterance. The attention model 1020 may be configured to take in output data from the trained model 1015 and produce an output for every time step (e.g., a 10 ms audio frame). The attention model 1020 may be configured to aggregate information from different time intervals / audio frames of the input audio data to determine how certain parts of the utterance affects determining of the sentiment. For example, an acoustic representation of a first word in the utterance may indicate a high arousal implying anger, in which case the attention model 1020 is configured to realize that the first word corresponds to an anger sentiment and that that should affect the processing of the other words in the utterance to ultimately determine a sentiment category corresponding to the utterance. In some embodiments, the functionality described here of the attention model 1020 may be performed by one or more layers of the trained model 1015. That is, the attention model 1020 may be part of the trained model 1015 and may not be a separate component from the trained model 1015. One or more layers of the trained model 1015 may be trained to perform the functionalities of the attention model 1020.

The attention model 1020 may output a score 1030 indicating a likelihood of the utterance corresponding to a sentiment category 1040. The attention model 1020 may output model output data including an indicator of a sentiment or a N-best list of scores and corresponding sentiment category. The sentiment detection component 275 may predict from multiple sentiment categories, including but not limited to, happiness, sadness, anger and neutral. In an example embodiment, the sentiment category 1040 may be determined after score(s) 1030 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 1040 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

Figure 11:
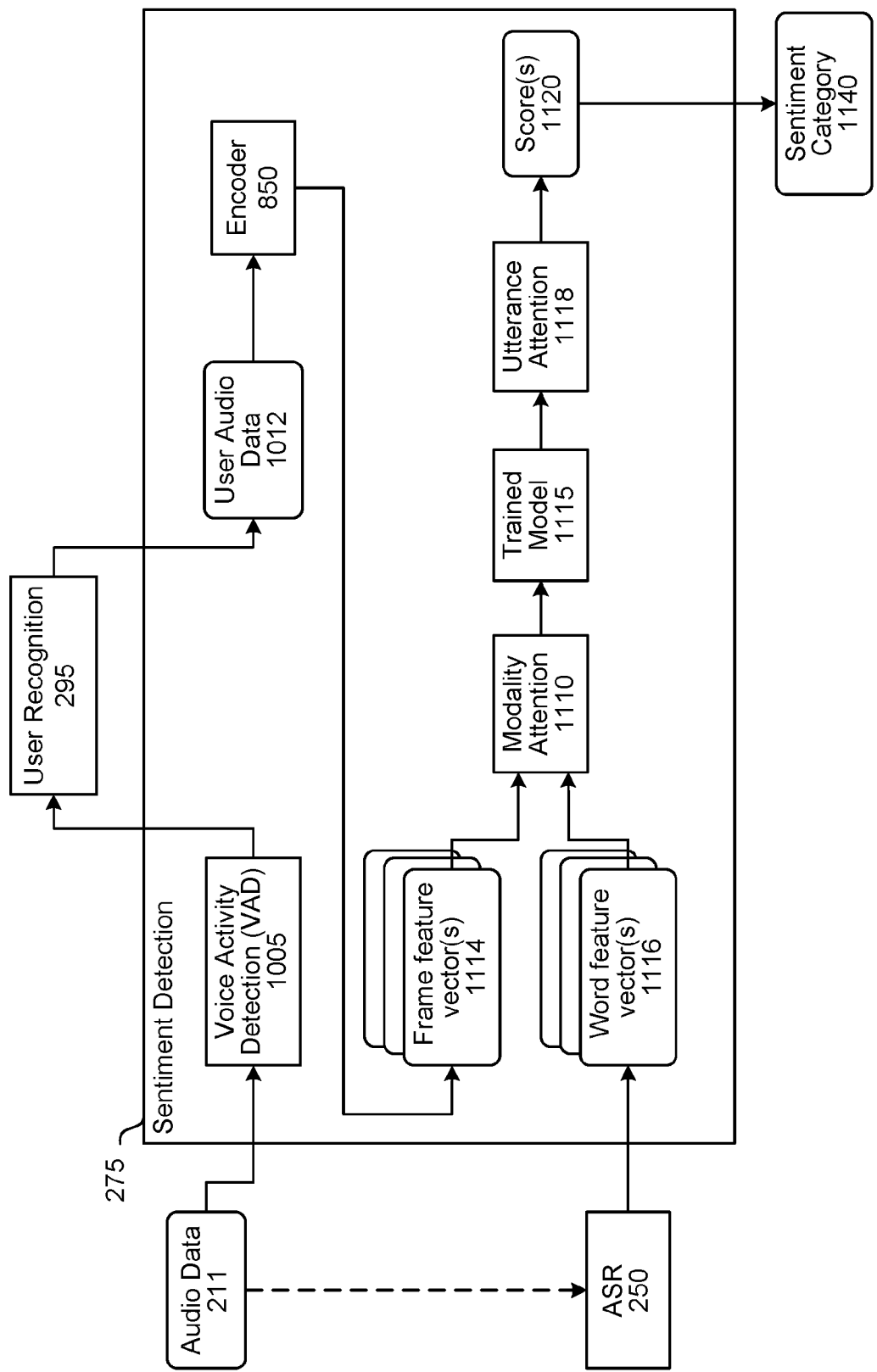
FIG. 11 is a conceptual diagram illustrating a sentiment detection component according to other embodiments of the present disclosure.

FIG. 11 is a conceptual diagram illustrating a sentiment detection component according to other embodiments of the present disclosure. In another embodiment, the sentiment detection component 275 may include a voice activity detection (VAD) component 1005, a modality attention component 1110, a trained model 1115 and an utterance attention component 1118. The audio data 211 captured by a device 110 may be inputted into the VAD component 1005. The sentiment detection component 275 may reside with a device 110a, with another device proximate to, and in communication with device 110 such as device 110b or with a remote device such as with system(s) 120. If the sentiment detection component 275 does not reside on the device 110a that is capturing audio, the sentiment detection component 275 may not necessarily include the VAD component 1005 (or may not necessarily include other components) and may or may not include other components as well. The precise composition of the sentiment detection component 275 depends on system configuration.

The VAD component 1005 may be configured to perform the functionalities described above in connection with FIG. 10. The user recognition component 295 (which may be located on a same or different device as the sentiment detection component 275) may be configured to perform the functionalities described above in connection with FIG. 10.

The user audio data 1012 may be a portion of the audio data 211 that includes speech or one or more utterances from a particular user associated with the user profile. In other words, audio data representing a particular user's speech may be isolated and stored as the user audio data 1012 for further analysis. In an example embodiment, the user may be associated with or using the device 110, and may have provided permission to the system(s) 120 to record and analyze his or her voice / conversations to determine a sentiment category corresponding to the conversation.

Prior to performing further analysis on the user audio data 1012, the sentiment detection component 275 may confirm that the user has granted permissions to analyze speech spoken by the user for sentiment detection.

The user audio data 1012 may be inputted into an encoder 1150 (described further in relation to FIG. 11) to determine frame feature vector(s) 1114. The encoder 1150 may be a bidirectional LSTM. The frame feature vector(s) 1114 may represent audio frame level features extracted from the user audio data 1012. One frame feature vector 1114 may represent features corresponding to an individual word in the utterance. The sentiment detection component 275 may determine the portions of user audio data 1012 that correspond to individual words and may extract acoustic features from the respective portions of audio using the encoder 1150. The frame feature vector(s) 1114 may be derived by spectral analysis of the user audio data 1012.

The ASR component 250, as described above, may generate an ASR output including text data representative of one or more utterances represented in the audio data 211. In some embodiments, the system sends audio data 211 to the ASR component 250 for processing. In other embodiments, the system sends user audio data 1012 to the ASR component 250 for processing. The ASR output may be represented as word feature vectors 1116, where each word feature vector 1116 may correspond to a word in the text data determined by the ASR component 250 and may represent lexical information of the utterance. The word feature vector 1116 may be a word embedding.

In an example embodiment, the sentiment detection component 275 determines that the user audio data 1012 includes an entire utterance. That is, the sentiment detection component 275 may determine that a beginpoint of the user audio data 1012 corresponds to a beginpoint of an utterance, and an endpoint of the user audio data 1012 corresponds to an endpoint of the utterance. In this case, the frame feature vectors 1114 and the word feature vectors 1116 may represent all the words in one utterance.

The sentiment detection component 275 may align a frame feature vector 1114 with a corresponding word feature vector 1116 such that the pair represents acoustic information and lexical information, respectively, for an individual word in the utterance represented in user audio data 1012. The frame feature vectors 1114 and the word feature vectors 1116 may be processed by the trained model 1115 simultaneously.

The trained model 1115 may process the frame feature vector(s) 1114 and corresponding word feature vector(s) 1116 using a ML model trained according to the process and architecture described in connection with FIG. 8. In some embodiments, the sentiment detection component 275 includes a modality attention component 1110 configured to determine how much acoustic information versus how much lexical information from the respective feature vectors 1114, 1116 should be used by the trained model 1115. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 1110 may assign a weight or percentage to the data represented by the acoustic feature vectors and the data represented by the lexical feature vectors to indicate the importance of each to the trained model 1115.

The trained model 1115 may be a neural network, for example a bi-directional LSTM. The output of the trained model 1115 may be fed into an utterance attention component 1118. The utterance attention component 1118 may employ a neural network, for example a recurrent neural network, that is trained according to the process and architecture described in connection with FIG. 6. The utterance attention component 1118 may be configured to emphasize relevant portions of an input utterance. The utterance attention component 1118 may be configured to take in output data from the trained model 1115 and produce an output for every time step (e.g., a 10 ms audio frame). The utterance attention component 1118 may be configured to aggregate information from different time intervals / audio frames of the input audio data to determine how certain parts of the utterance affects determining of the sentiment. For example, an acoustic representation of a first word in the utterance may indicate a high arousal implying anger, in which case the utterance attention component 1118 is configured to realize that the first word corresponds to an anger sentiment and that that should affect the processing of the other words in the utterance to ultimately determine a sentiment category corresponding to the utterance.

The utterance attention component 1118 may output score 1120 indicating a sentiment category 1140 for the user audio data 1012. The sentiment detection component 275 may predict from multiple sentiment categories, including but not limited to, happiness, sadness, anger and neutral. In an example embodiment, the sentiment category 1140 may be determined after score(s) 1120 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 1140 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

Although the above discussion illustrates sentiment detection component 275 operating on audio data 211 and/or text data (such as that output by ASR 250), the sentiment detection component 275 may also operate on data of other modalities such as image data, video data, biometric data (for example obtained by a wearable device), presence data, and/or other sensor data available to the system 120, assuming user permission for accessing and using such data.

For purposes of operating trained model 235, for example using deletion component 265, or the like, the characteristic data considered by the model 235 or the system may include sentiment data, for example data representing the sentiment category / categories 1040 / 1140 and/or score(s) 1030 / 1120. In this manner, the user's sentiment during a user input may be considered during operation of the trained model 235 / deletion component 265 during runtime to make more informed decisions as to the likelihood of a user requesting deletion of data related to a user input. For example, a user may regularly delete utterances that may be spoken when the user was angry (for example, as determined by sentiment detection 275). The system (e.g., the trained model 235 / deletion component 265) may be configured to incorporate an understanding of this behavior and may thus flag utterances spoken when the user was angry as candidates for potential deletion. Other such scenarios using sentiment detection may also be possible using the present system.

For example, data for an incoming utterance may be processed using sentiment detection 275. Sentiment data for the utterance may be associated with data for the utterance which may be stored, for example in profile storage 270 or otherwise. The user may later instruct the system "delete my angry utterances." The system may then determine utterances corresponding to the indicated sentiment (e.g., angry) and may identify data corresponding to those determined utterances and indicate that data for deletion. Such operations may be possible with various sentiments (e.g., mad, sad, etc.).

Figure 12:
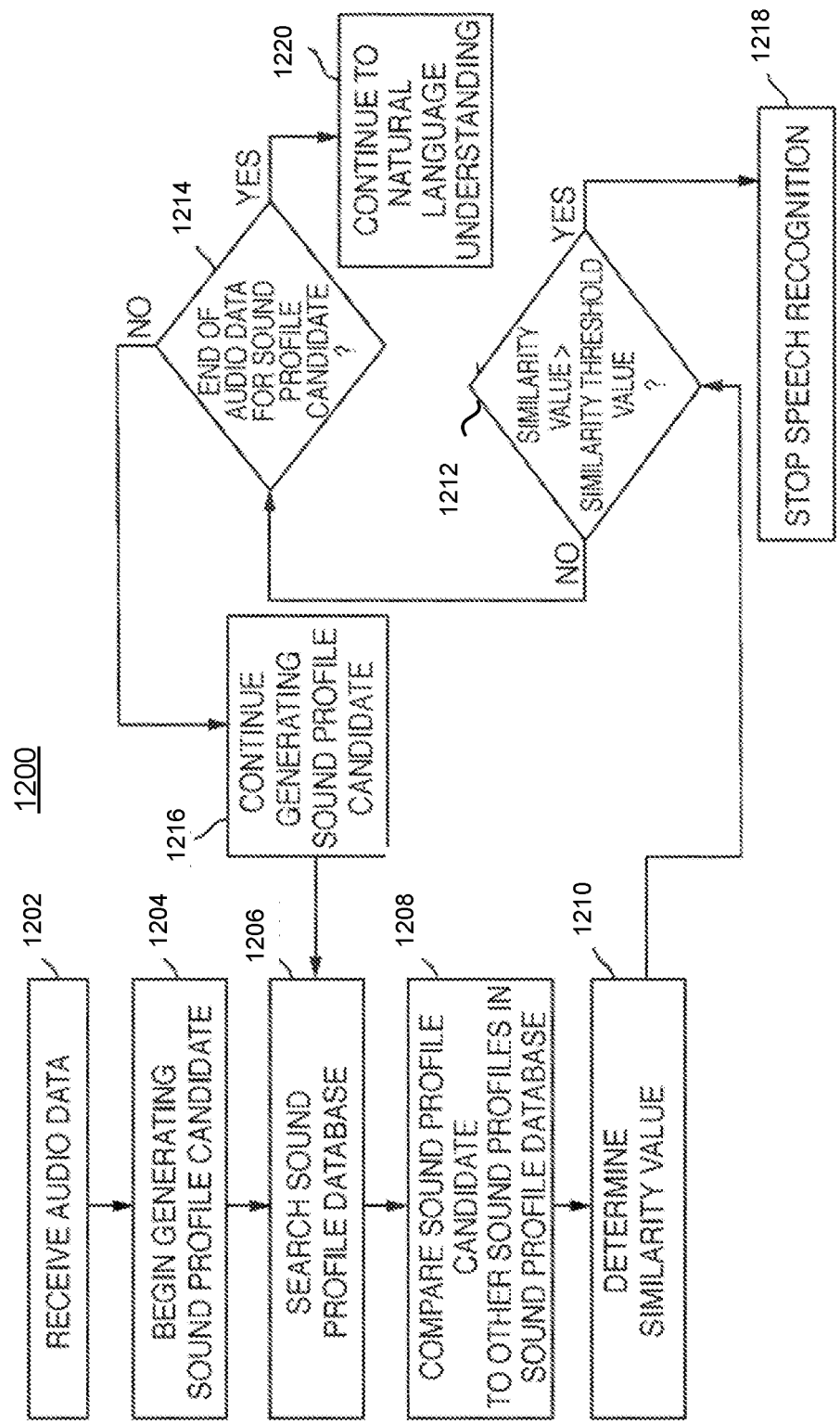
FIG. 12 is an illustrative flowchart of a process for determining whether a sound profile candidate of a portion of audio data corresponds to a sound profile stored in a sound profile database, in accordance with various embodiments of the present disclosure.

FIG. 12 is an illustrative flowchart of a process for determining whether a sound profile candidate of a portion of audio data corresponds to a sound profile stored in a sound profile database, in accordance with various embodiments. Process 1200, which may be implemented by sound profile comparison component 277, in some embodiments, may begin at step 1202. At step 1202, audio data 211 may be received by system 120. The audio data 211 may be received from device 110 as a result of the device 110 detecting a wakeword, for example using wakeword detection component 220.

At step 1204, a sound profile of the audio data may begin to be generated by sound profile comparison component 277, a sound profile generation component, or some other component. In some embodiments, a sound profile generation component may begin generating a sound profile of the audio data upon receipt of the audio data. For example, the audio data may be received in one block, such that all of the audio data is received together. As another example, the audio data may instead by received in multiple blocks. In this particular scenario, a first few milliseconds or seconds, or any other temporal duration of audio data, may be received by system 120, and a sound profile generation component may begin generating a sound profile for that portion of the audio data that has so far been received.

After the sound profile of the portion of the audio data is generated, a sound profile database (which may be included within and/or in communication with sound profile comparison component 277) may be searched at step 1206. At step 1208, the generated sound profile may be compared to one or more of the sound profiles stored within sound profile database to determine if a similarity value between the generated sound profile and a stored sound profile is greater than a similarity threshold value. The sound profiles stored within sound profile database may correspond to audio of varying lengths. In some embodiments, the generated sound profile may be compared not only with each stored sound profile, but with each portion of each sound profile stored within sound profile database. For example, the generated sound profile may correspond to a first 3 seconds of the audio data. Thus, the generated sound profile may be compared with each 3 second portion of each sound profile. For instance, for a stored sound profile corresponding to a 4 second audio file, the generated sound profile may compared with a first portion of the stored sound profile corresponding to the first 3 seconds of audio, as well as be compared to a second portion of the stored sound profile corresponding to the next 3 seconds of audio.

At step 1210, a similarity value between the generated sound profile and the various sound profiles stored within sound profile database, as well as each portion of the sound profile stored within sound profile database, may be determined. If the similarity value that is determined to be greater than a similarity threshold value, then the two sound profiles may be said to be substantially similar. For example, the similarity value may correspond to a bit error rate between the two sound profiles. As an illustrative example, a first sound profile G(1) and a second sound profile G(2) may be compared with one another. The two sound profiles may be declared as being substantially similar to one another, to a high degree of accuracy, if the bit error rate difference between the two sound profiles is less than or equal to a bit error rate threshold value, T, as described in Equation 1 below. An individual may set the bit error rate threshold T, or it may be set by the system 120, and may indicate how different the bit masks of the two sound profiles are. If the threshold T, is set very low, then the likelihood that a match exists between two sound profiles that obey Equation 1 would be very high.

$$\|G(1)-G(2)\| \leq T \qquad \text{Equation 1}$$

To determine the bit error rate, (e.g., the bit rate difference between the two sound profiles), a difference between the bit values (e.g., "1"-bit or "0"-bit) for each audio frame and frequency band may be determined for the first and second sound profiles. The difference will, therefore, yield a "0" if the two bit values for each of the first and second audio profile are the same, whereas the difference would yield a "1" if the two bit values for the first and second audio profiles differ. If a total number of "1s" is less than or equal to a predefined threshold value (e.g., threshold T), then the two sound profiles may be said to be equivalent. If the total number of "1s" is greater than the predefined threshold value, then the two sound profiles are declared as being different. Thus, if the bit error rate difference is below the bit error rate threshold, T, then the similarity value between the two sound profiles would be high, indicating that the two sound profiles are substantially similar. If no match is determined, (e.g., the bit error rate between the first and second sound profiles is greater than the threshold), then, in one embodiment, speech processing (for example, ASR, NLU and/or the like) may continue.

In some embodiments, sound profiles G(1) and G(2) may correspond to a portion of the audio data, such as initial audio data received by system 120 from device 110. At step 1212, a determination may be made as to whether the similarity value between two sound profiles is greater than predefined similarity threshold value indicating a similarity between the two sound profiles. For example, a bit error rate between two sound profiles that is less than a bit error threshold value may indicate that the two sound profiles differ less than a certain threshold value, and therefore the two sound profiles may be considered to be similar up to a certain degree of accuracy.

If, at step 1212, it is determined that the similarity value is greater than the similarity threshold value, then process 1200 may proceed to step 1218 where speech recognition processing (or other processing related to the audio data) may be caused to stop. In some embodiments, at step 1218, an instruction may be generated that causes a device that provided the audio data (for example device 110) to return to a sleep state (e.g., where the device 110 shuts down certain operations and returns to a state where it is awaiting detection of the wakeword). Furthermore, in some embodiments, at step 1218, the system 120 may instruct a device 110 to stop sending any remaining portions of the audio data to system 120.

If, at step 1212, it is determined that the similarity value between the two sound profiles is less than the threshold value, the process 1200 may proceed to step 1214. At step 1214, a determination may be made as to whether the audio data that has been used to generate the sound profile corresponds to the end of the audio data. For example, if the audio data used to generated the sound profile at step 1204 is an end of the audio data, or if there is no more audio data that is to be received by system 120, then no more sound profile of the audio data may generated. If, at step 1214, it is determined that the audio data used to generate the sound profile is the end of the audio data, then process 1200 may proceed to step 1220. At step 1220, speech processing may continue such that text data representing the phrase may be generated and provided to natural language understanding functionality. For example, text data may be generated and one or more subject matter servers/skills from subject matter servers/skills 290 may be accessed to obtain response information, a response may be generated, and responsive audio data may be generated and provided back to a requesting device.

If, however, at step 1214, it is determined that the audio data is not at its end, then process 1200 may proceed to step 1216, where a sound profile generation module continues to generate a sound profile for the received audio data. In some embodiments, additional audio data may be received, and an additional sound profile may be generated for the additional audio data. The additional sound profile may then be combined with the sound profile already generated, and a new sound profile may be used to compare with one or more sound profiles stored within sound profile database to determine whether or not the new sound profile has a similarity value that is greater than the similarity threshold value. For instance, after the next portion or portions of the sound profile are generated for the additional audio data, process 1200 may return to step 1206, where sound profile database may be searched, and a comparison between the new sound profile and the stored sound profiles, may occur.

A stored sound profile may correspond to audio of an event that may accidentally trigger a wakeword detection component 220 of a device 110. For example, a television commercial or other mass-media event may accidentally cause a device to wake and begin transmitting audio to system 120, even if such an occurrence was not desired by a user. To counteract unnecessary processing of non-intended audio, the system 120 may store a sound profile corresponding to the commercial or other mass-media event (or other sound that may correspond to audio that should not be processed). Thus, if the system detects a sufficient similarity between input audio data and a stored sound profile (e.g., 1212:Yes), for example where the stored sound profile corresponds to a mass-media event (e.g., audio of a commercial that includes the wakeword), the system may stop speech recognition.

If such a similarity is detected, the system may also directly flag that audio data for deletion, for example using deletion component 265. Alternatively, or in addition, the system may incorporate an indication of a similarity between the input audio data and a stored sound profile (along with potentially an indication of the specific sound profile that was matched) into the characteristic data corresponding to the input audio data that may be processed by the trained model 235 to determine whether specific data related to the audio data (such as the audio data itself, a record thereof, etc.) should be deleted, for example by operation of the trained model 235 by the deletion component 265.

Although the discussion above discusses determining characteristic data related to a user input for purposes of detecting whether data related to the user input should be deleted, the system may also perform operations herein with regard to portions of a user input. For example, one set of characteristic data may go with a first portion of a user input and another set of characteristic data may go with a second portion of a user input. Operations (such as determination of respective deletion scores) using the deletion component 265 / trained model 235 may thus differ for different sections of the user input based on the different sets of characteristic data. This may result in a portion of user input data being deleted and another portion of the user input data not being deleted.

In another configuration, the system may operate such that deletion of data related to a user input is the default rather than storage. In such a configuration, the trained model 235 may operate to determine whether data related to a particular user input should be maintained rather than deleted. Other operations as described herein may be similar to those described, only the score / determination made by the deletion component 265 / trained model 235 is to whether data should be maintained. If a decision is made not to maintain the data, it may be deleted according to default or other configurations of the system.

Further, although the system is described where component 265 and model 235 are focused on operations to determine whether to delete data, both component 265 and model 235 may be trained and operated to make other decisions with regard to data related to user input. In one example, component 265 and model 235 may be trained and operated to de-link stored data from a user profile associated with a user (such as a user profile in profile storage 270). Such a de-linking may not involve the system fully deleting data, but rather may involve deleting an association between the data and a specific user profile (such as by deleting a user ID linked to data or changing the linked user ID to a pseudonymous user ID or the like). For example, if a user typically requests the system to de-link certain types of data, the system may, using component 265 and/or model 235, determine that a new user input is likely to be subject to a similar de-linking operation.

In another example, component 265 and model 235 may be trained and operated to change a permission with regard to stored data. Such a permission change may, for example, change what skills / system components may access user data. For example, a user may in certain circumstances allow a set of preferred skills certain information about the user's utterances to make predictions for enhanced user experiences. If the user typically requests that the system remove those permissions and indicate certain user inputs as private, the system may, using component 265 and/or model 235, determine that a new user input is likely to be subject to a similar permission change.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
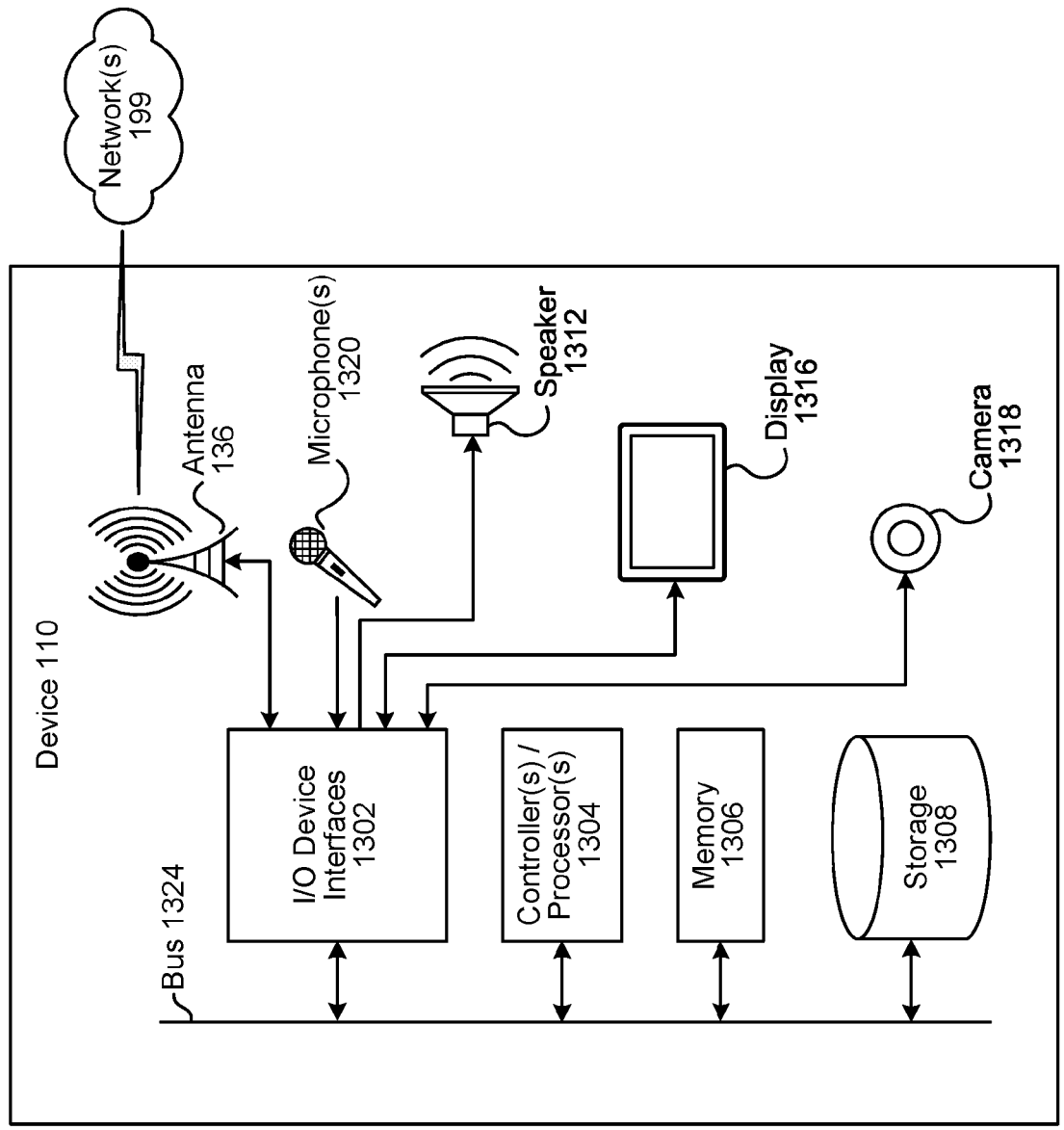
FIG. 13 is a block diagram conceptually illustrating example components of a device, in accordance with embodiments of the present disclosure.
Figure 14:
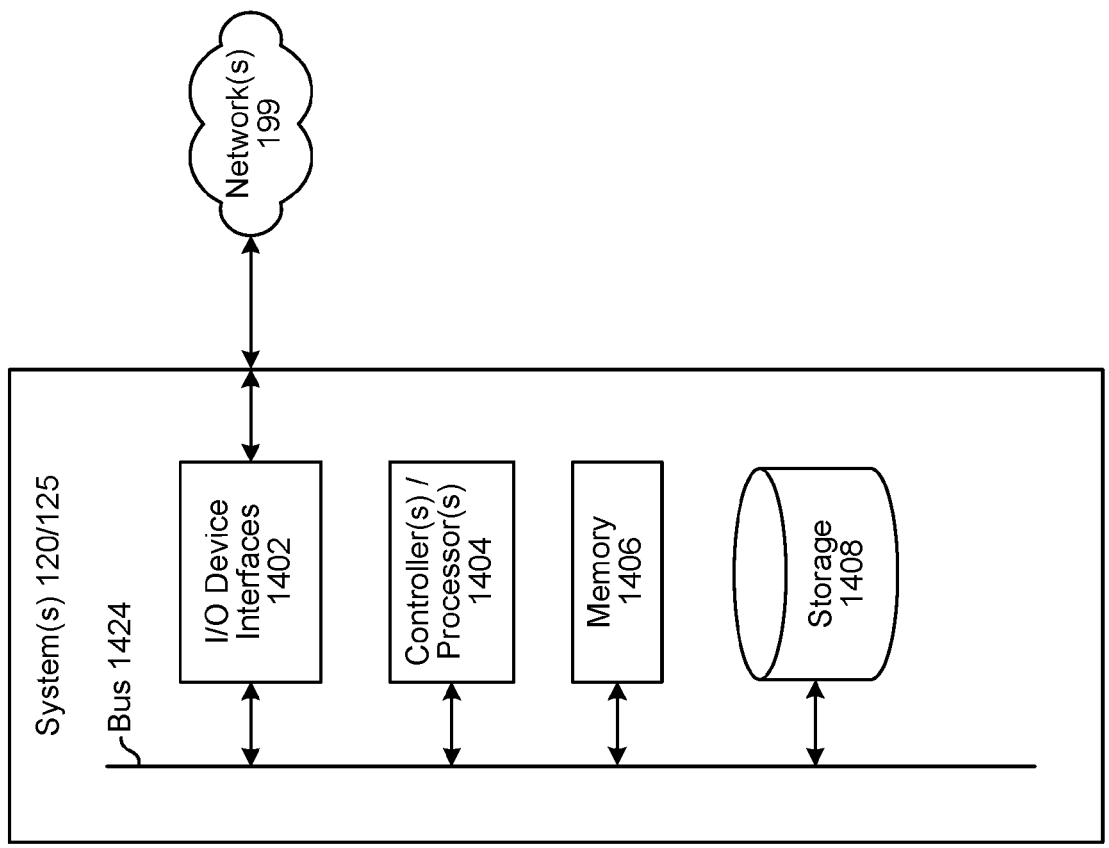
FIG. 14 is a block diagram conceptually illustrating example components of a system, in accordance with embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server / client computing structure but may also refer to a number of different computing components that may assist with the operations discussed herein. For example, a server may include one or more physical computing components (such as a rack server) that are connected to other devices / components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 136, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1302/1402), processor(s) (1304/1404), memory (1306/1406), and/or storage (1308/1408) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 15:
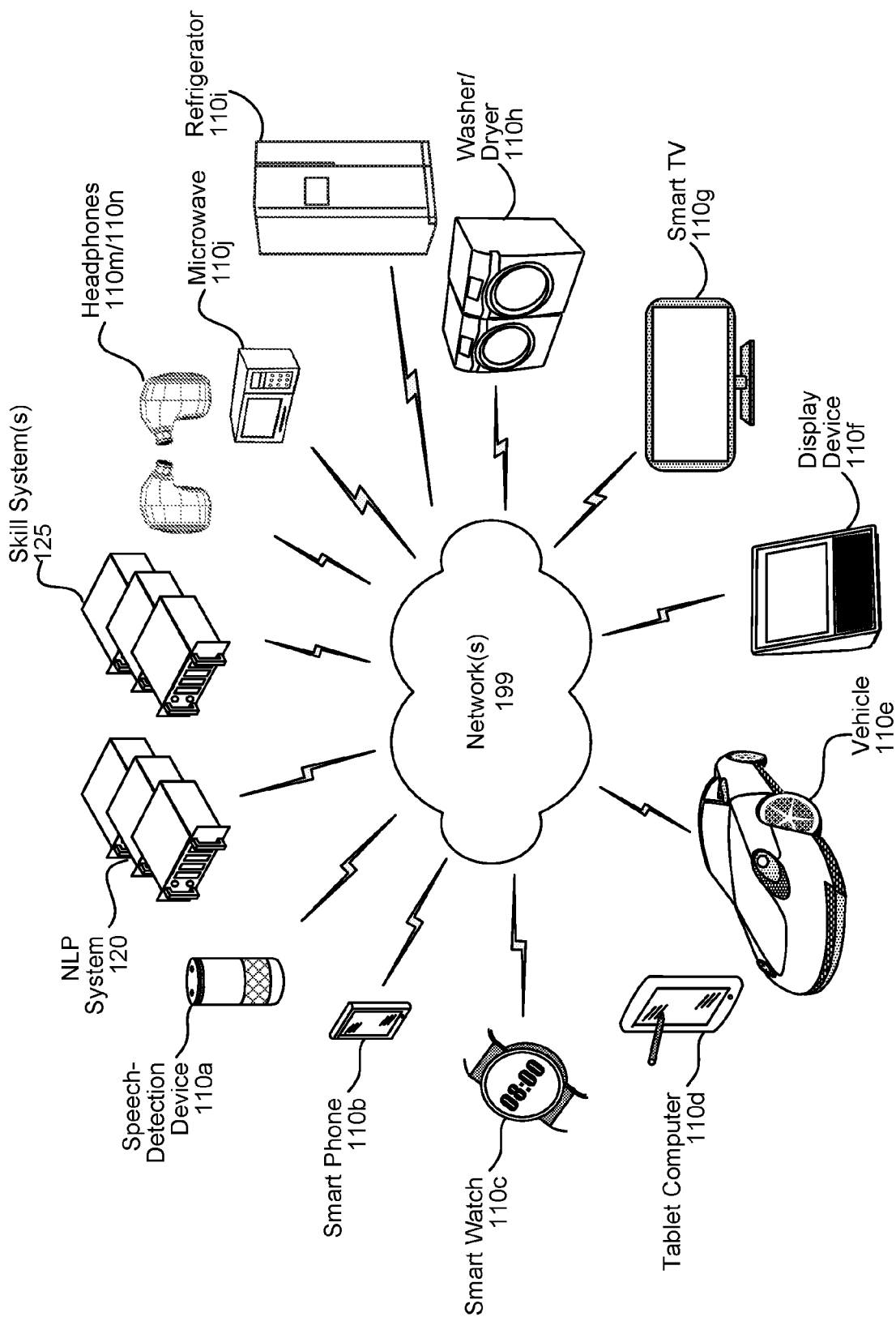
FIG. 15 illustrates an example of a computer network for use with the overall system, in accordance with embodiments of the present disclosure.

As illustrated in FIG. 15, multiple devices (110a-110n, 120, 125) may contain components of the system and the devices may be connected over a network(s) 199. In some implementations, each device 110 may include data about itself when transmitting input data over the network 199 to the natural language command processing system 120. For example, a device 110 may include data representing a device type; for example, a speech-detection device or a smart TV. In another example, a device 110 may include data representing device capabilities; for example, speech input or video display. Such data regarding device type and device capabilities can be included by the system 120 in the characteristic data used by a deletion component of the system 120 to determine the likelihood that certain data will be selected for deletion. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data corresponding to a first user profile, the first audio data representing a first utterance;
   performing speech processing on the first audio data to determine a first user command;
   executing the first user command;
   storing first data related to processing of the first utterance;
   receiving a request to delete the first data;
   causing the first data to be deleted;
   determine first characteristic data corresponding to the first utterance;
   using the first characteristic data to configure at least one trained model;
   storing association data with respect to the first user profile, the association data associating the first user profile with the at least one trained model;
   receiving second audio data corresponding to the first user profile, the second audio data representing a second utterance;
   determining second data related to processing of the second utterance;
   determining second characteristic data corresponding to the second utterance; and
   processing the second characteristic data using the at least one trained model to determine the second data is to be selected for deletion.

2. The computer-implemented method of claim 1, further comprising:
   storing a sound profile representing a mass-media event that includes a representation of a wakeword;
   determining a similarity between the second audio data and the sound profile;
   including, in the second characteristic data, data indicating detection of the mass-media event; and
   causing the second audio data to be deleted.

3. The computer-implemented method of claim 1, wherein:
   performing speech processing includes performing natural language understanding (NLU) processing to determine a semantic meaning corresponding to the second utterance; and
   the method further comprises:
      determining that the NLU processing failed to produce output data representing the semantic meaning of the second utterance with sufficient confidence to proceed with identifying a user command;
      requesting user confirmation corresponding to the second utterance;
      detecting that no user confirmation corresponding to the second utterance has been received; and
      selecting the second data for deletion.

4. The computer-implemented method of claim 1, further comprising:
   determining, from the first audio data, first sentiment data representing a first sentiment category associated with how the first utterance was spoken;
   including, in the first characteristic data, the first sentiment data;

processing the second audio data to determine second sentiment data representing the first sentiment category; and including, in the second characteristic data, the second sentiment data.

5. A computer-implemented method comprising:
receiving first input data corresponding to a first user input, the first input data corresponding to a first user profile;
processing the first input data to determine a first user command corresponding to the first input data ;
storing the first input data in a storage medium;
causing the first user command to be executed;
determining first characteristic data corresponding to the first input data;
determining a trained model associated with the first user profile; and
processing the first characteristic data using the trained model to determine that the first input data stored in the storage medium is to be selected for deletion from the storage medium.

6. The computer-implemented method of claim 5, wherein:
processing the first characteristic data using the trained model comprises determining, using the trained model, a score; and
the method further comprises:
determining that the score satisfies a condition, and
in response to the score satisfying the condition, causing the first input data to be deleted without receipt of a user confirmation of deletion of the first input data.

7. The computer-implemented method of claim 5, further comprising:
determining a wakeword confidence score; and
including the wakeword confidence score in the first characteristic data.

8. The computer-implemented method of claim 5, wherein the first input data comprises input audio data and the method further comprises:
determining a similarity between the input audio data and a stored sound profile corresponding to media data;
including, in the first characteristic data, an indication of the similarity; and
causing the input audio data to be deleted.

9. The computer-implemented method of claim 5, wherein:
processing the first input data to determine the first user command includes performing natural language understanding (NLU), including determining an NLU confidence score; and
the method further comprises:
determining that the NLU confidence score fails to satisfy a condition;
in response to determining that the NLU confidence score fails to satisfy the condition, requesting user confirmation of the first user command; and
in response to detecting that no user confirmation of the first user command has been received, selecting the first input data for deletion.

10. The computer-implemented method of claim 5, wherein the trained model is configured using second characteristic data corresponding to a second user profile, wherein the first user profile and the second user profile share at least one user profile characteristic.

11. The computer-implemented method of claim 5, further comprising:
receiving a second user command to delete the first input data;
processing the trained model, the first input data, the first characteristic data, and the second user command to generate a second trained model; and
deleting the first input data.

12. The computer-implemented method of claim 5, further comprising, prior to receiving the first input data:
receiving a second user command to delete second data corresponding to a second user input; and
configuring the trained model based on the second user command.

13. A system, comprising:
at least one processor; and
at least one memory comprising instructions that, when executed by the at least one processor, cause the system to:
receive first input data corresponding to a first user input, the first input data corresponding to a first user profile;
process the first input data to determine a first user command corresponding to the first input data;
store the first input data in a storage medium;
cause the first user command to be executed;
determine first characteristic data corresponding to the first input data;
determine a trained model associated with the first user profile; and
process the first characteristic data using the trained model to determine that the first input data stored in the storage medium is to be selected for deletion from the storage medium.

14. The system of claim 13, wherein:
the instructions that cause the system to process the first characteristic data using the trained model comprise instructions that, when executed by the at least one processor, further cause the system to determine, using the trained model, a score; and
the at least one memory further comprises instructions that, when executed by the at least one processor, further cause the system to:
determine that the score satisfies a condition, and
in response to the score satisfying the condition, cause the first input data to be deleted without receipt of a user confirmation of deletion of the first input data.

15. The system of claim 13, wherein the at least one memory further comprises instructions that, when executed by the at least one processor, further cause the system to:
determine a wakeword confidence score; and
include the wakeword confidence score in the first characteristic data.

16. The system of claim 13, wherein the first input data comprises input audio data and wherein the at least one memory further comprises instructions that, when executed by the at least one processor, further cause the system to:
determine a similarity between the input audio data and a stored sound profile corresponding to media data;
include, in the first characteristic data, an indication of the similarity; and
cause the input audio data to be deleted.

17. The system of claim 13, wherein:
the instructions that cause the system to process the first input data to determine the first user command include instructions that, when executed by the at least one processor, further cause the system to perform natural language understanding (NLU), including determining an NLU confidence score; and
the at least one memory further comprises instructions that, when executed by the at least one processor, further cause the system to:
determine that the NLU confidence score fails to satisfy a condition;
in response to determining that the NLU confidence score fails to satisfy the condition, request user confirmation of the first user command; and in response to detecting that no user confirmation of the first user command has been received, select the first input data for deletion.

18. The system of claim 13, wherein the trained model is configured using second characteristic data corresponding to a second user profile, wherein the first user profile and the second user profile share at least one user profile characteristic.

19. The system of claim 13, wherein the at least one memory further comprises instructions that, when executed by the at least one processor, further cause the system to:
  receive a second user command to delete the first input data;
  process the trained model, the first input data, the first characteristic data, and the second user command to generate a second trained model; and
  delete the first input data.

20. The system of claim 13, wherein the at least one memory further comprises instructions that, when executed by the at least one processor, further cause the system to, prior to receiving the first input data:
  receive a second user command to delete second data corresponding to a second user input; and
  configure the trained model based on the second user command.

* * * * *